United States Patent
Fujita et al.

(10) Patent No.: US 9,827,879 B2
(45) Date of Patent: Nov. 28, 2017

(54) POWER SEAT SLIDE DEVICE AND VEHICLE SEAT

(71) Applicant: DELTA TOOLING CO., LTD., Hiroshima (JP)

(72) Inventors: Etsunori Fujita, Higashihiroshima (JP); Yumi Ogura, Higashihiroshima (JP); Katsuhiro Inoue, Hiroshima (JP); Terumi Asai, Aki-gun (JP); Shinji Nishimoto, Hatsukaichi (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 14/897,995

(22) PCT Filed: Jun. 11, 2014

(86) PCT No.: PCT/JP2014/065487
§ 371 (c)(1),
(2) Date: Dec. 11, 2015

(87) PCT Pub. No.: WO2014/203785
PCT Pub. Date: Dec. 24, 2014

(65) Prior Publication Data
US 2016/0114703 A1    Apr. 28, 2016

(30) Foreign Application Priority Data

Jun. 16, 2013 (JP) .................................. 2013-126211
Nov. 11, 2013 (JP) .................................. 2013-233536
(Continued)

(51) Int. Cl.
*B60N 2/08* (2006.01)
*B60N 2/02* (2006.01)
(Continued)

(52) U.S. Cl.
CPC ......... *B60N 2/0825* (2013.01); *B60N 2/0232* (2013.01); *B60N 2/0244* (2013.01);
(Continued)

(58) Field of Classification Search
CPC ...... B60N 2/067; B60N 2/0825; B60N 2/165; B60N 2002/0236
(Continued)

(56) References Cited

U.S. PATENT DOCUMENTS 2,961,032 A * 11/1960 Pickles ................ B60N 2/0232
248/429
5,603,552 A * 2/1997 Hanna .................. B60N 2/0232
248/429
(Continued)

FOREIGN PATENT DOCUMENTS

DE    FR 2364137 A1 *  4/1978 ........... B60N 2/0232
DE    FR 2510952 A1 *  2/1983 ........... B60N 2/0224
(Continued)

OTHER PUBLICATIONS

International Search Report dated Sep. 9, 2014 for PCT/JP2014/065487 filed on Jun. 11, 2014.

*Primary Examiner* — Eret McNichols
(74) *Attorney, Agent, or Firm* — Oblon, McClelland, Maier & Neustadt, L.L.P.

(57) ABSTRACT

A power seat slide device capable of changing not only to an electric operation but also to an manual operation, and preventing half-lock in spite of a manually operable structure. For front-rear movement, a rack attached to a lower rail and a pinion meshed with the rack are used, and a driving force of a motor is transmitted to the pinion, which enables the use in an electric mode. As no slide screw is used, while (Continued)

the motor is not energized, rotating the pinion causes an output shaft of the motor to rotate, so that manual adjustment becomes possible.

20 Claims, 25 Drawing Sheets

(30) Foreign Application Priority Data

Nov. 18, 2013 (JP) ................................. 2013-238371
Nov. 21, 2013 (JP) ................................. 2013-241402

(51) Int. Cl.
*B60N 2/06* (2006.01)
*B60N 2/16* (2006.01)
*B60N 2/07* (2006.01)

(52) U.S. Cl.
CPC ............... *B60N 2/067* (2013.01); *B60N 2/07* (2013.01); *B60N 2/0881* (2013.01); *B60N 2/165* (2013.01); *B60N 2/1615* (2013.01); *B60N 2/1695* (2013.01); *B60N 2002/024* (2013.01); *B60N 2002/0236* (2013.01)

(58) Field of Classification Search
USPC ........................................ 248/419, 424, 429
See application file for complete search history.

(56) References Cited

U.S. PATENT DOCUMENTS

| | | | | |
|---|---|---|---|---|
| 6,302,481 B1 * | 10/2001 | Swann | ................... | B60N 2/067 297/216.1 |
| 6,488,337 B1 * | 12/2002 | De Voss | ................. | B60N 2/181 248/419 |
| 7,490,905 B2 * | 2/2009 | Ritter | ..................... | B60N 2/075 248/429 |
| 8,752,897 B2 * | 6/2014 | Fischbein | ................ | B60N 2/06 248/429 |
| 9,045,061 B2 * | 6/2015 | Kostin | ................. | B60N 2/1615 |
| 2003/0000796 A1 | 1/2003 | Kawai et al. | | |
| 2006/0231719 A1 | 10/2006 | Kayumi et al. | | |
| 2007/0108826 A1 * | 5/2007 | Kojima | ................ | B60N 2/1615 297/374 |
| 2014/0077554 A1 * | 3/2014 | Fujioka | .................. | B60N 2/067 297/313 |
| 2014/0238188 A1 * | 8/2014 | Ito | ........................ | B60N 2/0228 74/664 |
| 2015/0069807 A1 * | 3/2015 | Kienke | ................ | B60N 2/0232 297/344.1 |
| 2015/0191106 A1 * | 7/2015 | Inoue | ................... | B60N 2/0715 248/429 |
| 2016/0264024 A1 * | 9/2016 | Michels | .................... | B60N 2/14 |
| 2017/0067538 A1 * | 3/2017 | Ortiz | ........................ | F16H 1/48 |

FOREIGN PATENT DOCUMENTS

| | | | | | |
|---|---|---|---|---|---|
| DE | 2713693 | C2 * | 12/1987 | ............ | B60N 2/067 |
| DE | 3906659 | A1 * | 9/1990 | ............ | B60N 2/067 |
| DE | EP 0385289 | A2 * | 9/1990 | ............ | B60N 2/067 |
| DE | EP 0416303 | A2 * | 3/1991 | ............ | B60N 2/067 |
| DE | 3906659 | C2 * | 10/1993 | ............ | B60N 2/067 |
| DE | 19524069 | A1 * | 1/1997 | ........... | B60N 2/0232 |
| DE | 102012212142 | * | 10/2013 | ........... | B60N 2/0232 |
| DE | WO 2013156580 | A1 * | 10/2013 | ........... | B60N 2/0232 |
| FR | 573167 | A * | 6/1924 | ............ | B60N 2/067 |
| FR | 3024079 | A1 * | 1/2016 | ........... | B60N 2/0228 |
| GB | EP 2663491 | B1 * | 12/2015 | ............ | B60N 2/067 |
| JP | 04050536 | A * | 2/1992 | ........... | B60N 2/0224 |
| JP | 06-286506 | A | 10/1994 | | |
| JP | 08-156658 | A | 6/1996 | | |
| JP | 2003-120715 | A | 4/2003 | | |
| JP | 2003226167 | A * | 8/2003 | ........... | B60N 2/0232 |
| JP | 2004161244 | A * | 6/2004 | ............... | B60N 2/06 |
| JP | 2006-205756 | A | 8/2006 | | |
| JP | 2006-273021 | A | 10/2006 | | |
| JP | 2007-186143 | A | 7/2007 | | |
| JP | 2007-289240 | A | 11/2007 | | |
| JP | 2010-076553 | A | 4/2010 | | |
| JP | 2010-285011 | A | 12/2010 | | |
| JP | 2011-178369 | A | 9/2011 | | |
| JP | 2012-274105 | A | 6/2014 | | |
| WO | WO 2015066683 | A1 * | 5/2015 | ............... | B60N 2/14 |

* cited by examiner

POWER SEAT SLIDE DEVICE AND VEHICLE SEAT

TECHNICAL FIELD

The present invention relates to a power seat slide device and a vehicle seat.

BACKGROUND ART

As disclosed in Patent Document 1, a power seat slide device of a vehicle seat adopts a structure in which, for example, slide screws are pivotably disposed on upper rails, slide nuts screwed with the slide screws are disposed on, for example, lower rails, and by a motor rotating the slide screws or the slide nuts to change a screwing position of the both, the upper rails are moved relatively to the lower rails.

PRIOR ART DOCUMENT

Patent Document
Patent Document 1: Japanese Unexamined Patent Application Publication No. Hei 8-156658

DISCLOSURE OF THE INVENTION

Problem to be Solved by the Invention

As disclosed in Patent Document 1, the power seat slide device is electrically controlled by using the slide screws and the slide nuts, and the power seat slide device cannot be manually operated in a non-energized state. Further, the slide screws also play a role of strength members in the power seat slide device, and it is difficult to do away with the slide screws in the power seat slide device. On the other hand, manually operated sliders sometimes get into a half-locked state in which lock claws of a lock mechanism are hooked to engaged parts in a half-way manner since slide lock positions by the lock mechanism are set at intervals of several mm to ten several mm. Running in this state sometimes causes the lock claws to be fit into the engaged parts during the running to displace the position of a seat.

The present invention was made in consideration of the above, and has an object to provide a power seat slide device capable of changing to a manual operation as well as an electric operation, and a vehicle seat including the power seat slide device. Another object of the present invention is to provide a power seat slide device capable of preventing half-lock when the operation is changed to the manual operation, and a vehicle seat including the power seat slide device.

Means for Solving the Problems

In order to solve the aforesaid problems, a power seat slide device of the present invention is a power seat slide device which adjusts a pair of sliders arranged at a predetermined interval by a driving force of a motor to adjust a position of a seat cushion in a front-rear direction in a vehicle seat, the pair of sliders each including:
a lower rail fixed to a floor of the vehicle seat, with a longitudinal direction of the lower rail being along the front-rear direction of the seat cushion;
an upper rail disposed to be movable along the longitudinal direction of the lower rail and supporting a cushion frame of the seat cushion; and
a lock mechanism which locks the upper rail to the lower rail at an appropriate slide position, the device further including:
a rack disposed along the longitudinal direction of the lower rail; and
a pinion which is supported on the upper rail or the cushion frame, is meshed with the rack, and rotates by the driving force of the motor being transmitted thereto,
wherein, while the motor is energized, the motor is actuated in conjunction with a release operation of the lock mechanisms to rotate the pinion to cause front-rear movement of the upper rails along the lower rails, and
wherein, while the motor is not energized, the front-rear movement of the upper rails along the lower rails is enabled by manual adjustment.

Preferably, the motor has a gearbox interposed between the motor and the pinion and is capable of adjusting a rotation speed of the pinion.

Preferably,
a control circuit formed of a parallel circuit of a rectifying element and a resistor is interposed between the motor and a power source which supplies a current to the motor, and
setting is made so that switching to rotate the motor in one direction causes the current to flow from the power source to the motor and the rectifying element of the parallel circuit in the order mentioned, and switching to rotate the motor in the other direction causes the current to flow from the power source to the resistor of the parallel circuit and the motor in the order mentioned.

Preferably, the lock mechanisms are disposed on both sides of each of the upper rails, and the lock mechanisms are capable of performing the locking by engaging with the lower rails, and the motor is actuated in conjunction with the release operation of the lock mechanisms to rotate the pinion to cause the front-rear movement of the upper rails along the lower rails.

Preferably, the lock mechanisms each include an elastic lock member supported on the upper rail and formed of an elastic member having a lock claw engaged with an engaged part formed in the lower rail, and elasticity of the elastic lock members acts on the lower rails and the upper rails, with the elastic lock members serving as elastic fulcrums.

Preferably, the power seat slide device includes a guide member
which is supported on the upper rail or the cushion frame so as to be abuttable on a surface, of the rack, where teeth are not formed, and
which moves forward and rearward along the rack in accordance with the rotation of the pinion while being in a positional relation in which the guide member and the pinion in mesh with the teeth of the rack sandwich the rack, and suppresses backlash between the pinion and the rack.

Preferably, the pinion is meshed not only with the rack but also with an idle gear which applies a pressing force to the rack.

Preferably, the rack is attached, with one end being a fixed end fixed to the lower rail and with the other end being a free end which is not fixed.

Preferably, the rack is disposed along a side surface of the lower rail of one of the pair of sliders, with the teeth of the rack located at a lower height than an upper surface of the lower rail.

Preferably, in accordance with the front-rear movement of the upper rails along the lower rails while the motor is not energized, an electromagnetic force is generated in the motor due to rotation of a drive shaft of the motor, and the motor functions as a damper which makes the moving operation of the upper rails in the front-rear direction slow.

Preferably, a clutch is interposed between the motor and the pinion, and while the motor is energized, the clutch transmits a torque of the motor to the pinion to enable the electric adjustment, and while the motor is not energized, the clutch does not transmit a torque of the pinion to the motor and the manual adjustment of the movement of the upper rails in the front-rear direction is enabled.

Preferably, the clutch includes:

an input-side torque transmitting member including an input-side teeth part on a peripheral surface and provided so as to be displaceable in a radial direction by the torque of the motor;

an output-side torque transmitting member which includes an output-side teeth part meshable with the input-side teeth part in accordance with the displacement of the input-side teeth part in the radial direction, and which rotates the pinion; and a biasing member which biases the input-side teeth part in the radial direction being a direction in which the input-side teeth part separates from the output-side teeth part, torques both in forward and reverse directions from the motor side while the motor is energized displace the input-side torque transmitting member in the radial direction against an elastic force of the biasing member to bring the input-side teeth part into mesh with the output-side teeth part, and rotate the output-side torque transmitting member to be transmitted to the pinion, and while the motor is not energized, the elastic force of the biasing member separates the input-side teeth part from the output-side teeth part, and a counter input torque from the pinion side is cut off without being transmitted from the output-side torque transmitting member to the input-side torque transmitting member.

Preferably, the input-side torque transmitting member includes a plurality of plates, the input-side teeth part being formed on a peripheral surface of each of the plates, and includes a cam which is coupled to the drive shaft of the motor and which displaces the plates in the radial direction when rotating together with the drive shaft, to bring the input-side teeth parts into mesh with the output-side teeth part.

Preferably, the cam has cam-side tapered surfaces on a peripheral surface, and the plates have plate-side tapered surfaces facing the cam-side tapered surfaces, and either the cam-side tapered surfaces or the plate-side tapered surfaces are formed in a mountain shape and the others are formed in a valley shape, and in a positional relation in which apex portions and bottom portions face each other, the input-side teeth parts are at a non-meshed position where the input-side teeth parts are apart from the output-side teeth part, and when the apex portions and the bottom portions are separated from facing positions along the cam-side tapered surfaces or the plate-side tapered surfaces by the rotation of the drive shaft, the input-side teeth parts and the output-side teeth part are at a meshed position.

Preferably, the biasing member is a member which is coupled to the plates of the input-side torque transmitting member and which biases the plates in the radial direction so that the apex portions or the bottom portions of the plate-side tapered surfaces are at positions facing the bottom portions or the apex portions of the cam-side tapered surfaces.

Preferably, the cam-side tapered surfaces are formed on an outer peripheral surface of the cam, in each of the plates, the plate-side tapered surface is formed on an inner peripheral surface, and the input-side teeth part is formed on an outer peripheral surface, and the output-side torque transmitting member is formed of an internal gear having, on an inner peripheral surface, the output-side teeth part which comes into mesh with the input-side teeth parts.

Preferably, the power seat slide device further includes:

an up-down movement relay gear which transmits the torque of the pinion;

a lift gear which is meshed with the up-down movement relay gear to displace in an up-down direction; and a link mechanism including a plurality of links which pivot when the the lift gear displaces in the up-down direction and any of which is coupled to the side frame, and when the seat cushion moves forward by the operation of the sliders, the seat cushion moves up in conjunction with the sliders, and when the seat cushion moves rearward by the operation of the sliders, the seat cushion moves down in conjunction with the sliders.

Preferably, the up-down movement relay gear is formed of a worm disposed along a direction substantially perpendicular to the longitudinal direction of the slider, the lift gear is formed of a worm wheel meshed with the worm, and the power seat slide device has a self-lock function of hindering transmission of a force from the seat cushion to the sliders.

Preferably, the up-down movement relay gear is formed of a gear disposed coaxially with the pinion and smaller in diameter than the pinion.

Preferably, the plural links included in the link mechanism include front links and rear links which are disposed apart from each other in the front-rear direction of the upper rails and the side frames, the front links and the rear links having upper portions pivotally supported on the upper rails of the pair of sliders and having lower portions pivotally supported on the left and right side frames of the seat cushion, and the side frames are supported by the upper rails in a suspended manner, and a displacement amount between a lower limit position and an upper limit position of the front links accompanied by the front-rear movement of the seat cushion is smaller than a displacement amount between a lower limit position and an upper limit position of the rear links, whereby a seating surface angle when the seat cushion is at a front end and an upper limit becomes smaller than a seating surface angle when the seat cushion is at a rear end and a lower limit.

Further, a vehicle seat of the present invention is a vehicle seat including a seat cushion and a seat back, the vehicle seat including any of the above-described power seat slide devices.

Effect of the Invention

According to the present invention, owing to the structure in which, for the front-rear movement, the rack attached to the lower rail and the pinion engaged with the rack are used and the driving force of the motor is transmitted to the pinion, the use in the electric mode is enabled. On the other hand, because a slide screw is not used, while the motor is not energized, the drive shaft of the motor rotates when the pinion is rotated. This enables the manual adjustment. Consequently, it is possible to manually move the vehicle seat forward and rearward when an engine of a vehicle equipped with the power seat slide device of the present invention is off, or in such a case where an occupant is rescued in the event that electricity becomes off due to an accident. According to the present invention, the electromagnetic force is generated at this time in the motor when the drive shaft of the motor rotates, and consequently, the torque of the drive shaft is damped by the electromagnetic force, so that a speed of the movement of the upper rails in the front-rear direction along the lower rails is reduced. That is, during the non-energization period, it is possible for the motor to function as a damper utilizing the electromagnetic force. Therefore, during the non-energization period, even when the movement is continued until the locked state is produced by the lock mechanisms, the upper rails are smoothly locked with a suppressed movement.

Preferably, the lock mechanisms are disposed on both sides of each of the upper rails, and they are engaged with the lower rails to enable the locking. If the lock mechanisms are disposed on the both sides of each of the upper rails, they serve as strength members, which is suitable for eliminating a need for slide screws as strength members which have been necessary in a conventional power seat slide device.

Further, it is also possible to provide the clutch so as to prevent the force from being transmitted from the pinion side to the motor during the non-energization period. In this case, though the above-described damping of the movement of the upper rails is not possible, this method enables the co-use of the electric operation and the manual operation by using the aforesaid lock mechanisms. Incidentally, in this case as well, it is possible to damp the movement of the upper rails by combining an oil damper or the like. However, a structure in which the coupling with the motor is maintained even during the aforesaid non-energization period enables the use of the motor itself as a damper, which can eliminate a need for a separate oil damper or the like to contribute to structure simplification and cost reduction. Further, in the present invention, as the aforesaid lock mechanisms which lock the upper rails to the lower rails, lock mechanisms used in sliders of a manual adjustment type are used, and therefore, since the front-rear movement is electrically driven, the operation up to the lock position is ensured and what is called half-lock does not occur in the electric mode, though the lock positions are set at intervals of several mm to ten several mm.

DESCRIPTION OF EMBODIMENTS

Figure 1:
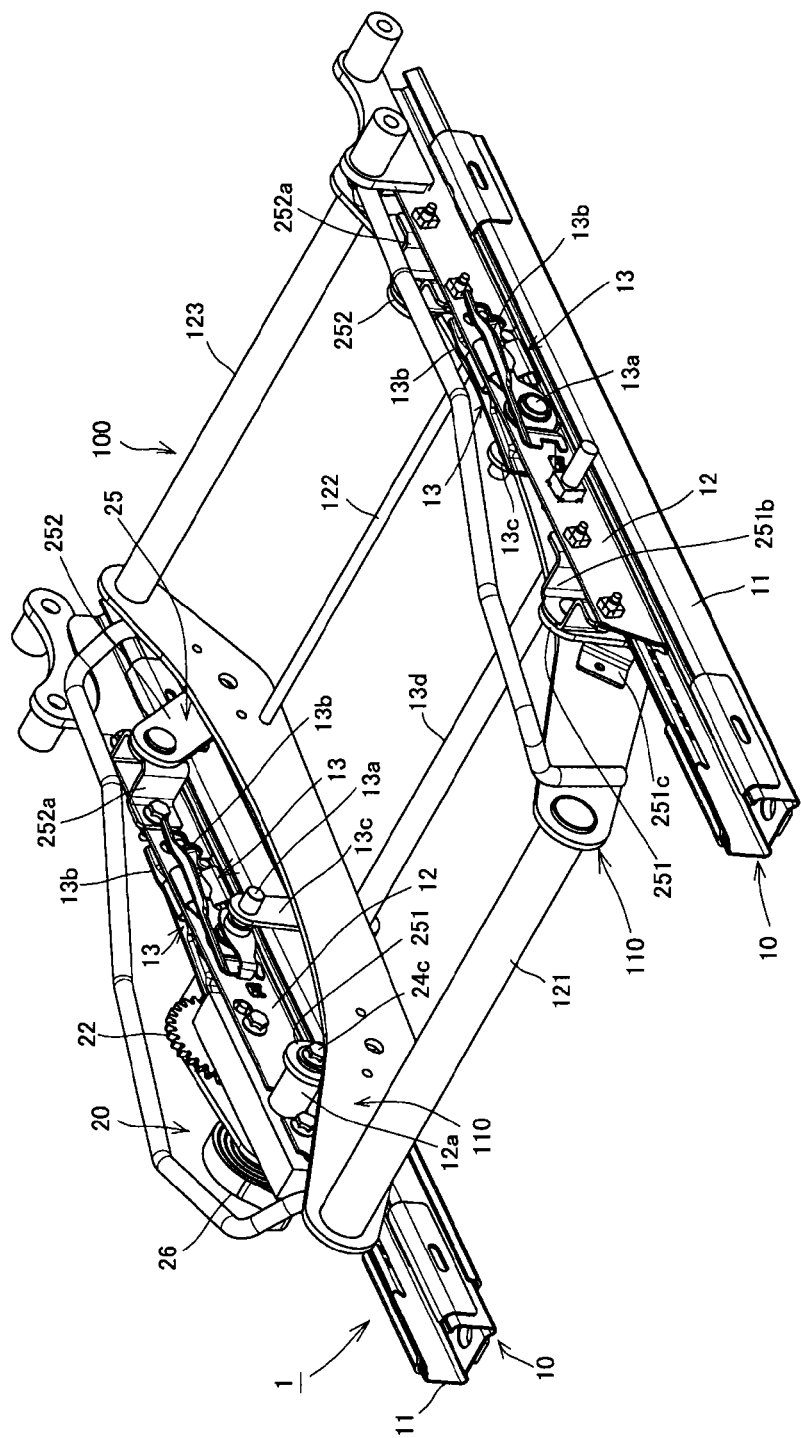
FIG. 1 is a perspective view illustrating a power seat slide device according to a first embodiment of the present invention and a cushion frame of a seat cushion supported on the power seat slide device.

Hereinafter, the present invention will be described in more detail based on embodiments illustrated in the drawings. FIG. 1 to FIG. 6 are views illustrating a power seat slide device 1 according to a first embodiment of the present invention, and the power seat slide device 1 includes: a pair of left and right sliders 10, 10 arranged at a predetermined interval in a width direction of a seat cushion; a slide control mechanism 20; an electric mechanism 50; and so on, and it supports a cushion frame 100 of the seat cushion, and is capable of adjusting a position of the seat cushion.

The sliders 10, 10 have a predetermined length, and include: lower rails 11, 11 fixed so that their longitudinal direction is along a front-rear direction of the seat cushion (cushion frame 100); and upper rails 12, 12 disposed to be movable along the longitudinal direction of the lower rails 11, 11.

For the purpose of weight reduction, as the lower rails 11, 11 and the upper rails 12, 12 of the respective sliders 10, 10, those whose sheet thickness is 1.8 mm or less are preferably used, and further those whose sheet thickness is in a range of 0.6 to 1.6 mm are preferably used. Further, as a material forming these, one whose tensile strength is within a range of 400 to 590 MPa is preferably used. This is because only a small energy amount is required to work such a material and it can be formed by a relatively small press machine, which can contribute to a demand for energy saving and helps reduce manufacturing cost.

In a case where the lower rails 11, 11 and the upper rails 12, 12 are formed of thin ones, some measure needs to be taken so that deformation by an impact force becomes substantially laterally uniform as much as possible and the upper rails 12, 12 do not come off the lower rails 11, 11 by the impact force within a predetermined range. Therefore, in this embodiment, lock mechanisms 13, 13 which fix relative positions of the upper rails 12, 12 to the lower rails 11, 11 are disposed on both sides of each of the upper rails 12, 12 as illustrated in FIG. 1. The lock mechanisms 13, 13 have lock claws at their tips, and the lock claws are engaged with engaged parts formed in the lower rails 11, 11, and because the lock mechanisms 13, 13 are disposed on the both sides of each of the upper rails 12, 12, a posture in the engaged state and a direction in which an engagement force works become substantially laterally symmetric, so that an unbalanced load is not likely to occur at the time of locking.

The left and right lock mechanisms 13, 13 in the pair of left and right sliders 10, 10 disposed at a predetermine interval include release members 13b, 13b which pivot on shaft portions 13a, 13a to release the engaged state of the lock claws, and include plate-shaped members 13c, 13c with a predetermined length hanging down from the left and right shaft portions 13a, 13a, and a coupling rod 13d is suspended between the plate-shaped members 13c, 13c. That is, operating the coupling rod 13d causes the release members 13b, 13b to pivot to release the four lock mechanisms 13, 13 in synchronization. In this embodiment, the coupling rod 13d is disposed via the plate-shaped members 13c, 13c hanging down from the shaft portions 13a, 13a, and this is because side frames 110 of the cushion frame 100 are supported in a suspended manner by the upper rails 12 via a later-described link mechanism 25 in order to set a hip point of the seat cushion low.

Here, the structure of the lock mechanisms 13 will be described in more detail based on FIG. 7 and FIG. 8. Specifically, the lock mechanisms 13 include elastic lock members 130 and the release members 13b. The elastic lock members 130 include: attachment plate parts 131 which are formed of elastic members, typically, spring steel (flat springs) and fixed to the upper rails 12, 12; and operating plate parts 132 which are supported on the attachment plate parts 131, have elastic forces with which they are constantly biased in directions away from vertical wall parts 12a, 12a of the upper rails 12, 12, and include the lock claws 133 protruding in the directions away from the vertical wall parts 12a, 12a and engaged with the plural engaged parts which are formed along the longitudinal direction in facing portions in the lower rails 11, 11. The release members 13b displace the operating plate parts 132 in directions of the vertical plate parts 12a, 12a of the upper rails 12, 12 against the elastic forces of the operating plate parts 132 to release the engaged state between the lock claws 133 and the engaged parts of the lower rails 11, 11.

The attachment plate parts 131 of the elastic lock members 130 have a shape along the vertical wall parts 12a, 12a of the upper rails 12, 12, and are fixed by rivets or the like. As illustrated in FIG. 8, the operating plate parts 132 are integrated with the attachment plate parts 131, and are bent from upper edges of the attachment plate parts 131 in the directions opposite the vertical wall parts 12a, 12a of the upper rails 12, 12 and downward. Further, the operating plate parts 132 have, in the middle, bulging portions 132a bulging in the directions away from the vertical wall parts 12a, 12a of the upper rails 12, 12. The lock claws 133 are formed in a comb teeth shape in such a manner that the vicinities of lower edges of the operating plate parts 132 under the bulging portions 132a are folded so as to project in the directions away from the vertical wall parts 12a, 12a. Incidentally, the attachment plate parts 131 included in the elastic lock members 130 are preferably disposed at substantially longitudinal-direction center portions of the upper rails 12, 12. A reason for this is that elasticity of the elastic lock members 130 act on the upper rails 12, 12 and the lower rails 11, 11, so that the lower rails 11, 11 and the upper rails 12, 12 are practically elastically deformable to be given a function of, for example, absorbing energy ascribable to vibration and an impact force, and the above arrangement can make this function exhibited more efficiently.

The release members 13b are disposed so that, about their one end portions, their other end sides pivot up and down, and when they come into contact with the bulging portions 132a in an attempt to pivot along outer surfaces of the operating plate parts 132, the bulging portions 132a are displaced in the directions of the vertical wall parts 12a, 12a. Consequently, the lock claws 133 displace in the directions of the vertical wall parts 12a, 12a, so that the engaged state is released. The one end portions of the release members 13b, that is, the totally four release members 13b are coupled by the coupling rod 13d suspended between the left and right upper rails 12, 12 as described above. Therefore, operating an operation part (not illustrated) coupled to either side of the coupling rod 13d causes the synchronous operation of the four lock release members to release the lock.

Figure 7:
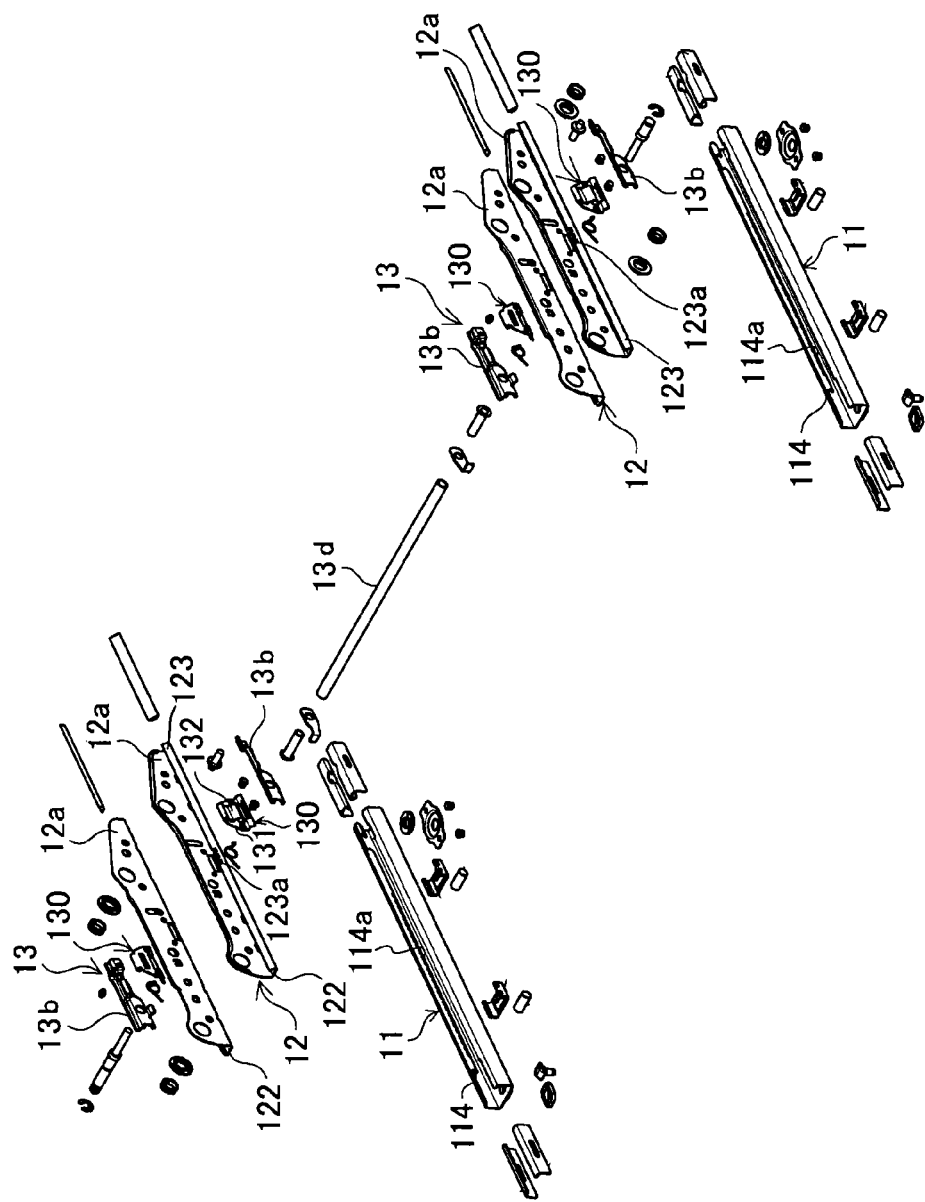
FIG. 7 is an explanatory view of the structure of lock mechanisms.
Figure 8:
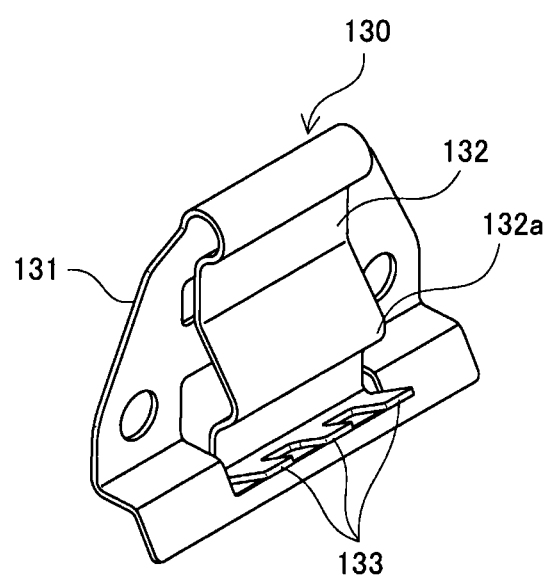
FIG. 8 is a perspective view illustrating an elastic lock member of the lock mechanism.
Figure 9:
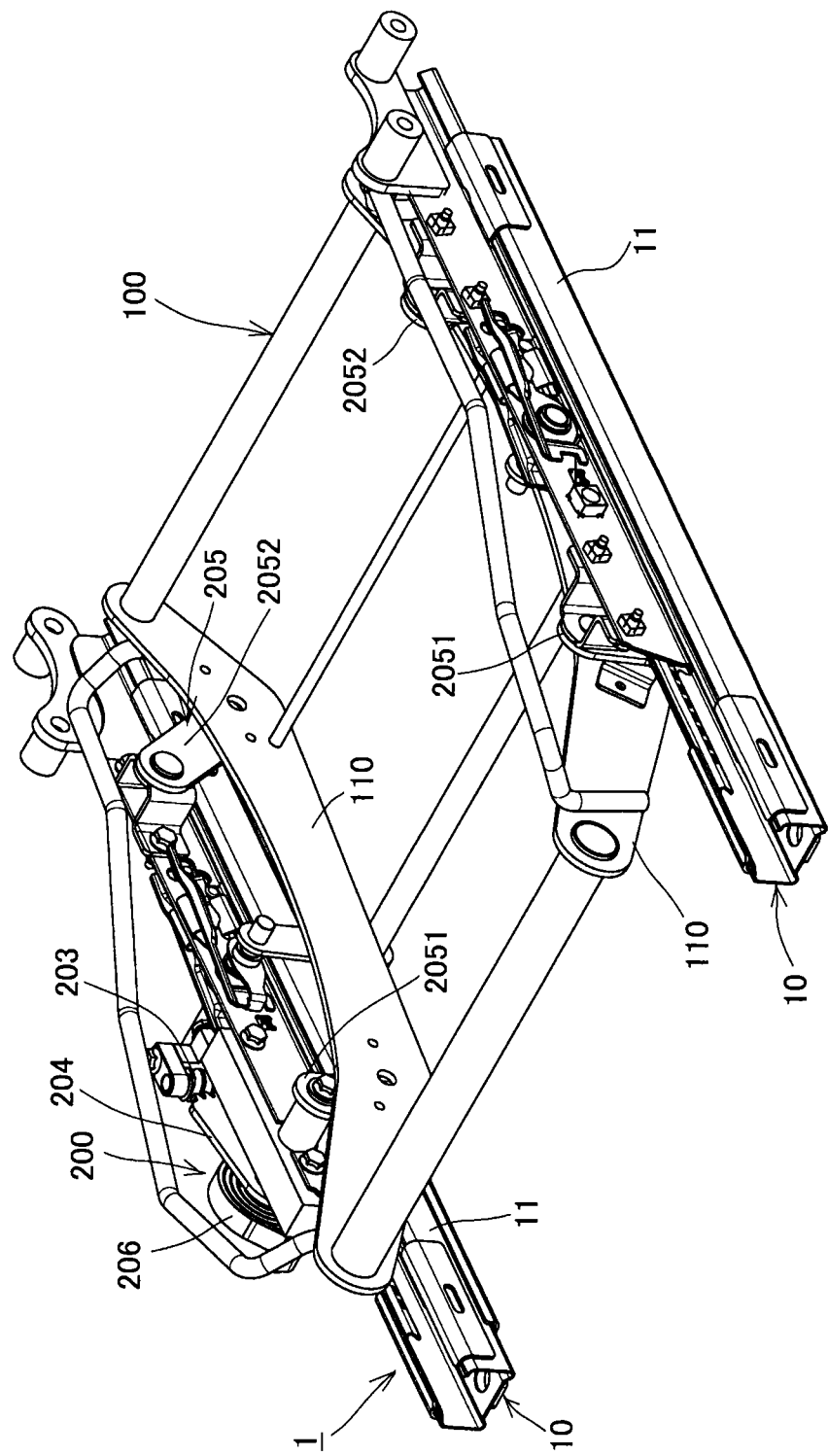
FIG. 9 is a perspective view illustrating a power seat slide device according to a second embodiment of the present invention and a cushion frame of a seat cushion supported on the power seat slide device.

Here, from facing edges of upper wall portions of the lower rails 11, 11, downward tilting wall parts 114, 114 extend, being bent obliquely downward, and the aforesaid engaged parts 114a, 114a of the lower rails 11, 11 are formed as a plurality of holes or grooves which are formed in the downward tilting wall parts 114, 114 along the longitudinal direction at intervals conforming to intervals between the adjacent claws of the lock claws 133 in the comb teeth shape (refer to FIG. 7).

Further, as illustrated in FIG. 7, the upper rails 12, 12 each have a substantially T-shaped cross section, and on horizontal wall parts 122, 122 corresponding to positions of horizontal lines of the character "T", upward tilting wall parts 123, 123 rising obliquely from outer edge portions toward the vertical wall parts 12a are formed, and the upward tilting wall parts 123, 123 are disposed so as to be located on outer sides of the downward tilting wall parts 114, 114 of the lower rails 11, 11. Further, in the upward tilting wall parts 123, 123 of the upper rails 12, 12, auxiliary engaged parts 123a, 123a being holes or grooves are formed at positions corresponding to the formation positions of the lock claws 133 (refer to FIG. 3, FIG. 4, and FIG. 7). When to lock, the lock claws 133 are engaged with the auxiliary engaged parts 123a, 123a after passing through the engaged parts 114a, 114a of the lower rails 11, 11, so that the auxiliary engaged parts 123a, 123a stably keep the engaged state of the lock claws 133. Therefore, this structure also achieves a function of maintaining the stable form of substantially lateral symmetry while the lock is working.

The slide control mechanism 20 includes a rack 21, a pinion 22, an up-down movement relay gear 23, a lift gear 24, the link mechanism 25, and an elastic member 26. Incidentally, the slide control mechanism 20 of this embodiment not only enables front-rear slide operation by the rack 21 and the pinion 22, but also enables up-down movement by the up-down movement relay gear 23, the lift gear 24, the link mechanism 25, and the elastic member 26, and it is configured to not only control the front-rear slide operation but also function as a slider-lifter interlocking mechanism which enables the up-down movement in accordance with the slide operation.

In this embodiment, the rack 21 is fixed to an outer side surface of the lower frame 11 included in one of the left and right sliders 10, 10, in this embodiment, the slider 10 corresponding to a right side of the seat cushion. Further, since, in the mechanism in this embodiment, later-described front links 251, 251 of the link mechanism 25 are pivoted to cause the up-down movement of front edge sides of the side frames 110 of the cushion frame 100 and rear links 252, 252 are made to follow this movement, the rack 21 is disposed from the vicinity of a longitudinal-direction center to a front end side of the lower frame 11. Further, teeth 21a of the rack 21 are formed on an upper surface of the rack 21 so as to be directed upward as illustrated in FIG. 2 to FIG. 6, and the height of the rack 21 is set so that its teeth 21a are located at a lower height than the upper surface of the lower rail 11.

On the upper rail 12, the pinion 22 is disposed on a side surface on the same side as the rack 21 disposed on the lower rail 11, is fit around a shaft part 22a which penetrates through the vertical wall part of the upper rail 12 in a thickness direction to be supported, and is disposed so as to have its peripheral teeth 22b meshed with the teeth 21a of the rack 21. Since the height of the teeth 21a of the rack 21 is lower than the upper surface of the lower rail 11, a range of a height difference therebetween includes a part of the pinion 22 in terms of a diameter direction. Therefore, a part of the pinion 22, protruding above the upper surface of the upper rail 12 is shorter than the diameter of the pinion 22, which is suitable for supporting the cushion frame 100 at a lower position.

In this embodiment, the up-down movement relay gear 23 for enabling the up-down movement is formed of a gear (spur gear) smaller in diameter than the pinion 22, and is supported coaxially with the pinion 22, that is, on the shaft part 22a. Therefore, when the pinion 22 rotates in mesh with the rack 21, the spur gear being the up-down movement relay gear 23 also rotates together with the pinion 22.

The lift gear 24 is formed of a fan-shaped plate member and has, near its peripheral surface, an arc-shaped hole part 24a, and the arc-shaped hole part 24a has an arc-shaped teeth 24b on its inner peripheral surface. The arc-shaped teeth 24b are meshed with the spur gear being the up-down movement relay gear 23. One end portion of a power transmission shaft 24c is coupled to a position near the center of the arc of the arc-shaped teeth 24b of the lift gear 24 (that is the vicinity of the center of the fan-shaped plate member).

Here, as illustrated in FIG. 1, the cushion frame 100 being a skeletal frame of the seat cushion includes: the pair of left and right side frames 110, 110 disposed at a predetermined interval; and a plurality of pipe members 121 to 123 disposed between the pair of left and right side frames 110, 110 at a front edge side, a rear edge side, and a position therebetween respectively. Further, the width of the cushion frame 100, that is, the interval between the pair of left and right side frames 110, 110 is set narrower than an interval between the lower frames 11, 11 of the pair of left and right sliders 10, 10. This enables the cushion frame 100 to be supported by the upper rails 12, 12 in a suspended manner. Incidentally, the side frames 110, 110 are in a shape having center plate parts 110a, 110a, front plate parts 110b, 110b extending ahead obliquely upward from the center plate parts 110a, 110a, and rear plate parts 110c, 110c extending aback obliquely upward from the center plate parts 110a, 110a (refer to FIG. 3). This shape is intended to make a cushioning member supported on the cushion frame have a predetermined shape when it is placed.

The link mechanism 25 includes: the pair of left and right front links 251, 251; and the pair of left and right rear links 252, 252 disposed so as to be apart rearward from the front links 251, 251 along the longitudinal direction of the upper rails 12, 12 and the side frames 110, 110. Among these, the front link 251 corresponding to a width-direction right side of the seat cushion has an upper portion coupled to the other end portion of the power transmission shaft 24c. The power transmission shaft 24c is disposed so as to be inserted to a shaft bearing cylinder part 12a which is disposed in the thickness direction of the upper rail 12 near a front end of the upper rail 12, the vicinity of the center of the lift gear 24 is coupled to one end portion being an outer end side of the power transmission shaft 24c, and the upper portion of the right front link 251 is coupled to the other end portion being its inner end side. A lower portion of the right front link 251 is pivotally supported on the vicinity of a boundary between the front plate part 110b and the center plate part 110a of the right side frame 110 via a bracket 251a. The left front link 251 has an upper portion and a lower portion pivotally supported on the left upper rail 12 and on the vicinity of a boundary between the front plate part 110b and the center plate part 110a of the left side frame 110 via brackets 251b, 251c respectively.

The rear links 252, 252 both have upper portions pivotally supported on rear portions of the left and right upper rails 12 via brackets 252a, 252a respectively, and have lower portions pivotally supported on the vicinities of boundaries between the rear plate parts 110c, 110c and the center plate parts 110a, 110a of the side frames 110 via brackets 252b, 252b respectively.

Figure 2:
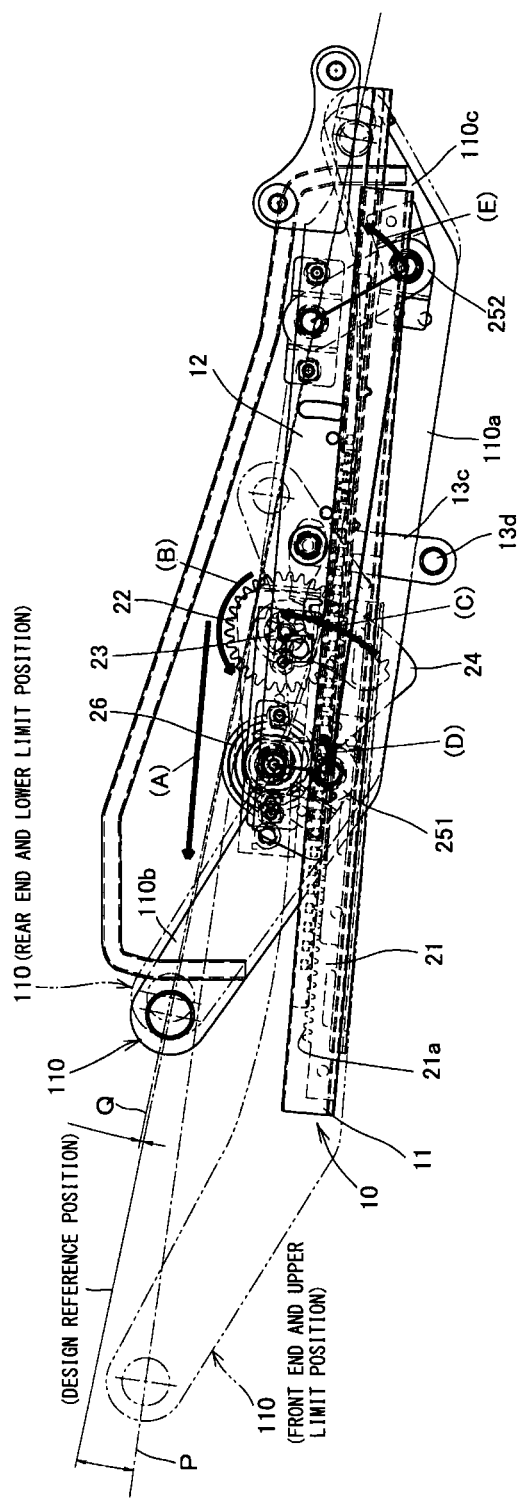
FIG. 2 is a side view of FIG. 1.

As described above, the front links 251, 251 and the rear links 252, 252 both have the upper portions pivotally supported on the upper rails 12, 12 side and have the lower portions pivotally supported on the side frames 110, 110 sides of the cushion frame 100, so that the cushion frame 100 is supported in a suspended manner by the upper rails 12, 12 via the link mechanism 25. This makes it possible to set a design position of a hip point of the cushion frame 100 low since, in the cushion frame 100, most of the center plate parts 110a, 110a of the side frames 110, 110 and parts of the front plate parts 110b, 110b and the rear plate parts 110c, 110c are located at the height of the upper surfaces of the lower rails 11, 11 or lower in a side view as illustrated in FIG. 2.

Postures of the front links 251, 251 and the rear links 252, 252 at lower limit positions (when the upper rails 12, 12 are at a rear end position) are both closer to vertical postures as illustrated in FIG. 6(a), while their postures at upper limit positions (when the upper rails 12, 12 are at a front end position) are closer to horizontal postures as illustrated in FIG. 6(b). At this time, a height-direction displacement amount between the lower limit position and the upper limit position of the front links 251, 251 is set smaller as compared with a height-direction displacement amount of the rear links 252, 252. In this embodiment, as the front links 251, 251, those shorter than the rear links 252, 252 are used, and at the lower limit position (when the upper rails 12, 12 are at the rear end position), in the side view, the front links 251 251 are disposed so as to have the vertical posture or a tilting posture relatively to the vertical posture with their lower portions being a little more forward than their upper portions, and the rear links 252, 252 are disposed so as to have a tilting posture relatively to the vertical posture with their lower portions being more rearward than their upper portions (refer to FIG. 6(a)), so that the aforesaid difference in the displacement amount occurs.

By thus setting the front links 251, 251 and the rear links 252, 252, the seat cushion in a state where the cushioning member is disposed on the cushion frame 100 has a smaller seating surface angle (line indicated by the reference sign "P" in FIG. 2) at the upper limit positions (when the upper rails 12, 12 are at the front end position) than its seating surface angle (line indicated by the reference sign "Q" in FIG. 2) at the lower limit position (when the upper rails 12, 12 are at the rear end position). Therefore, in a case of a person of smaller build who often operates the sliders 10, 10 forward when using them, it is possible to reduce a pressing force that the front edge portion of the seat cushion gives to his/her femoral regions when he/she operates a pedal since the seating surface angle becomes smaller in accordance with the forward movement. On the other hand, in a case of a person of bigger build who often operates the sliders 10, 10 rearward when using them, he/she sometimes has a difficulty in operating the pedal because of his/her long leg if the seating surface angle is small, but the large seating surface angle in this embodiment eliminates such inconvenience. Note that, in the state where the cushioning member is disposed on the cushion frame 100, the difference between the seating surface angle (the line indicated by the reference sign "Q" in FIG. 2) of the seat cushion at the lower limit position (when the upper rails 12, 12 are at the rear end position) and its seating surface angle (the line indicated by the reference sign "P" in FIG. 2) at the upper limit position (when the upper rails 12, 12 are the front end position) is preferably within a range of about 3 to 8 degrees.

Figure 3:
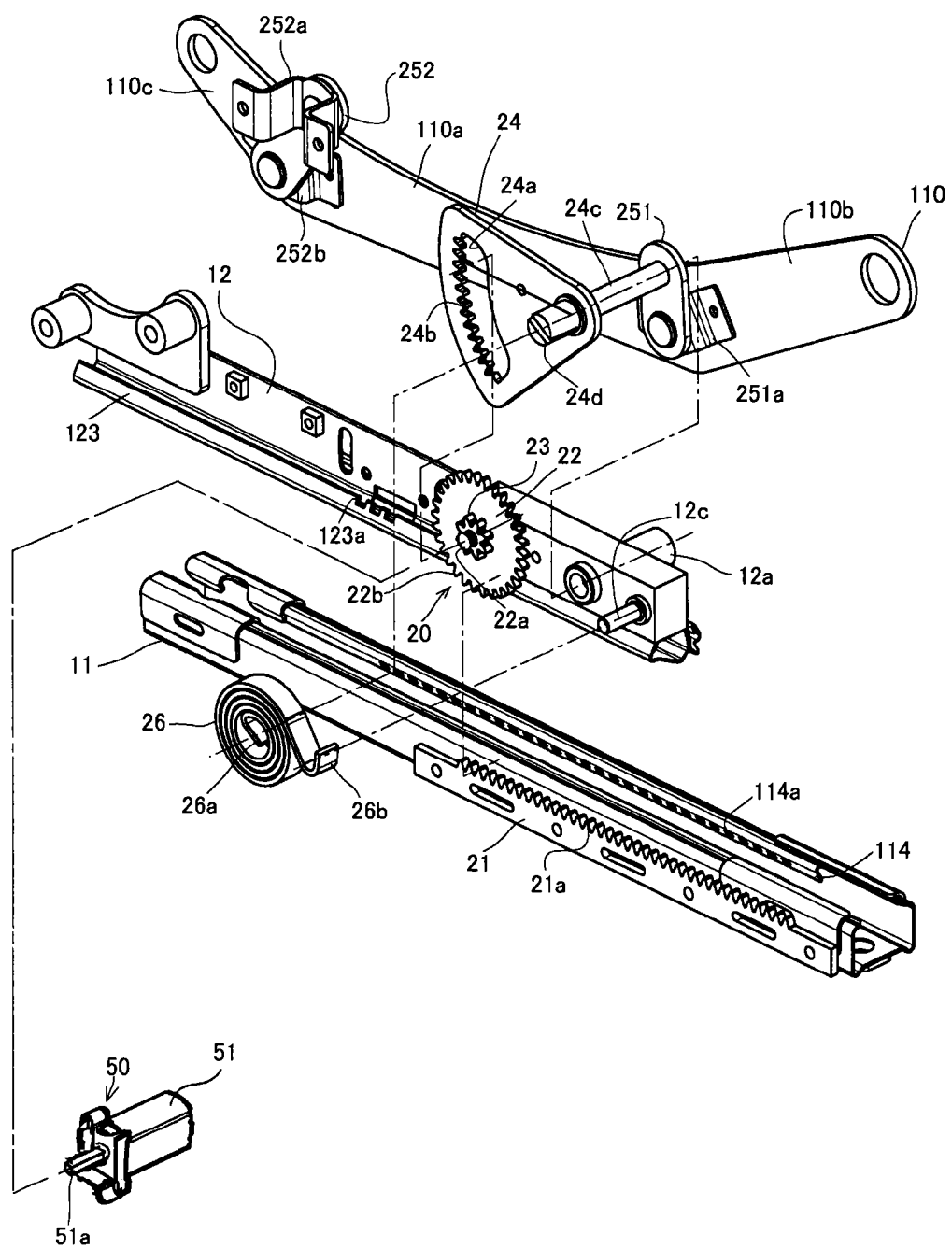
FIG. 3 is an explanatory exploded perspective view of the structure of sliders and an electric mechanism in FIG. 1.

The elastic member 26 biases the cushion frame 100 forming the seat cushion in an ascending direction and applies a force for lifting up the cushion frame 100. The elastic member 26 may be any, provided that it achieves such a function. In this embodiment, as illustrated in FIG. 3, a spiral spring is used as the elastic member 26, and its inner end portion 26a is fit in a slit 24d incised in the other end portion being the inner end side of the power transmission shaft 24c. Further, near the front end of the upper rail 12, a support shaft 12c is protrudingly disposed, and an outer end portion 26b of the spiral spring is fit on the support shaft 12c. Since the power transmission shaft 24c is coupled to one of the side frames 110 of the cushion frame 100 via one of the front links 251, the elastic member 26 is disposed between the side frame 110 and the upper rail 12. Since elasticity of the spiral spring constantly acts in a spreading direction, the side frame 110 is biased in the ascending direction relatively to the upper rail 12.

Figure 5:
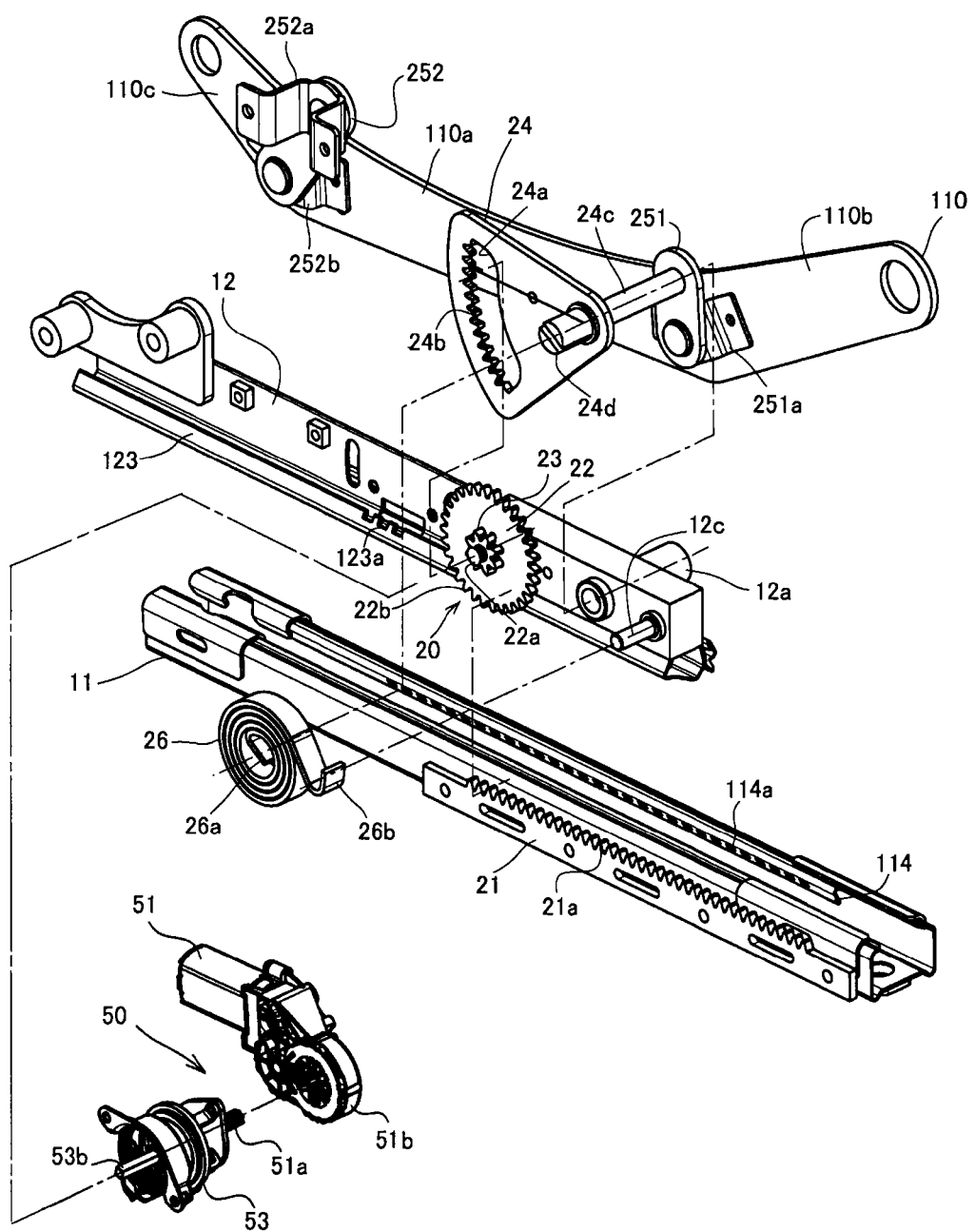
FIG. 5 is an exploded perspective view illustrating an example when a clutch is further used as the electric mechanism in FIG. 4.

Here, the electric mechanism 50 includes a motor 51. In FIG. 3, the electric mechanism 50 is composed only of the motor 51, and a drive shaft 51a of the motor 51 is coupled so as to be capable of rotating the pinion 22. Note that, in this specification, the "drive shaft 51a" is a shaft which transmits a torque of the motor 51, and what it means includes not only a shaft directly connected to a main body of the motor 51 as in FIG. 3 but also a shaft which transmits the torque to another member (for example, a clutch 53) via a gearbox 51b as illustrated in FIG. 5 and so on which will be described later. In the electric mode, when the motor 51 rotates, its torque rotates the pinion 22 via the drive shaft 51a, or via an appropriate gear mechanism as required. As a result, the pinion 22 moves in, for example, a forward rolling direction relatively to the rack 21, but since the pinion 22 is attached to the upper rail 12 via the shaft part 22a, the forward rolling of the pinion 22 causes the upper rails 12, 12 relatively to the lower rails 11, 11 to move forward together with the pinion 22.

According to this embodiment, owing to the configuration to transmit the torque of the motor 51 to the pinion 22, the torque of the motor 51 is transmitted to the pinion 22 while the motor 51 is energized, whether the torque is in the forward direction or the reverse direction, but when a power source of the motor 51 is in a non-energized state and the lock mechanisms 13 are in the lock release mode, a force input from the pinion 22 side rotates the drive shaft 51a. That is, in the non-energized state and the lock release mode of the lock mechanisms 13, when a seated person applies a force causing the hip to move forward or rearward, or when a force causing the vehicle seat to move forward or rearward is externally applied, the seat cushion including the cushion frame 100 and the cushioning member and so on disposed on the upper portion of the cushion frame 100 try to move either forward or rearward. Then, since the upper rails 12, 12 of the sliders 10, 10 are coupled to the side frames 110, 110 of the cushion frame 100 forming the seat cushion, the upper rails 12, 12 move in the forward or rearward direction relatively to the lower rails 11, 11. Consequently, even when the engine is off or in the non-energized state due to an accident or the like, it is possible to manually slide the upper rails 12, 12 forward and rearward relatively to the lower rails 11, 11.

Incidentally, in this embodiment, in the above case of the manual front-rear movement, the pinion 22 also rotates forward or rearward, and its torque rotates the drive shaft 51a of the motor 51. The rotation of the drive shaft 51a causes a rotor to rotate relatively to a stator in the motor 51, so that an electromagnetic force is generated. This electromagnetic force damps the torque of the drive shaft 51a and also damps the torque of the pinion 22 coupled to the drive shaft 51a, so that the moving operation of the upper rails 12, 12 in the front-rear direction becomes slow as compared with a case where a damping force does not act. That is, the motor 51 functions as a damper utilizing the electromagnetic force. As a result, in this embodiment, it is possible to make the front-rear movement of the upper rails 12 slow at the time of the manual adjustment, without a separate damper mechanism such as an oil damper being provided.

A switch for changing to the electric mode can be disposed on the coupling rod 13d of the lock mechanisms 13. For example, the coupling rod 13d is rotated by an operation lever and the lock is released by the release members 13b. At this time, adoptable is a structure in which the switch of the motor 51 turns on when the coupling rod 13d is rotated to reach a predetermined position.

As described above, the lock mechanisms 13 are disposed on both sides of each of the upper rails 12, 12, the lock is enabled by the lock mechanisms 13 being engaged with the lower rails 11, 11, and the motor is actuated in conjunction with the release operation of the lock mechanisms 13 to rotate the pinion 22 disposed along the lower rail 11, 11, so that the upper rails 12, 12 move forward or rearward along the lower rails 11, 11. In this embodiment, since the lock mechanisms 13 are disposed on the both sides of each of the upper rails 12, 12, and in addition, they have the laterally well-balanced structure as described above, they serve as strength members, which eliminates a need for slide screws as the strength members which have been necessary in a conventional power seat slide device. Further, since the slide screws are not used, the front-rear movement is enabled by the aforesaid manual operation during the non-energized period. Further, as for the lock position of the lock mechanisms 13, the lock claws 133 are engaged with the engaged parts 114a, 114a which are disposed in the lower rails 11, 11 at predetermined intervals, whereby the locked state is produced as described above. At this time, since the front-rear movement is electrically caused in this embodiment, the operation surely continues up to the lock position, and what is called half-lock is not caused in the electric mode.

Figure 4:
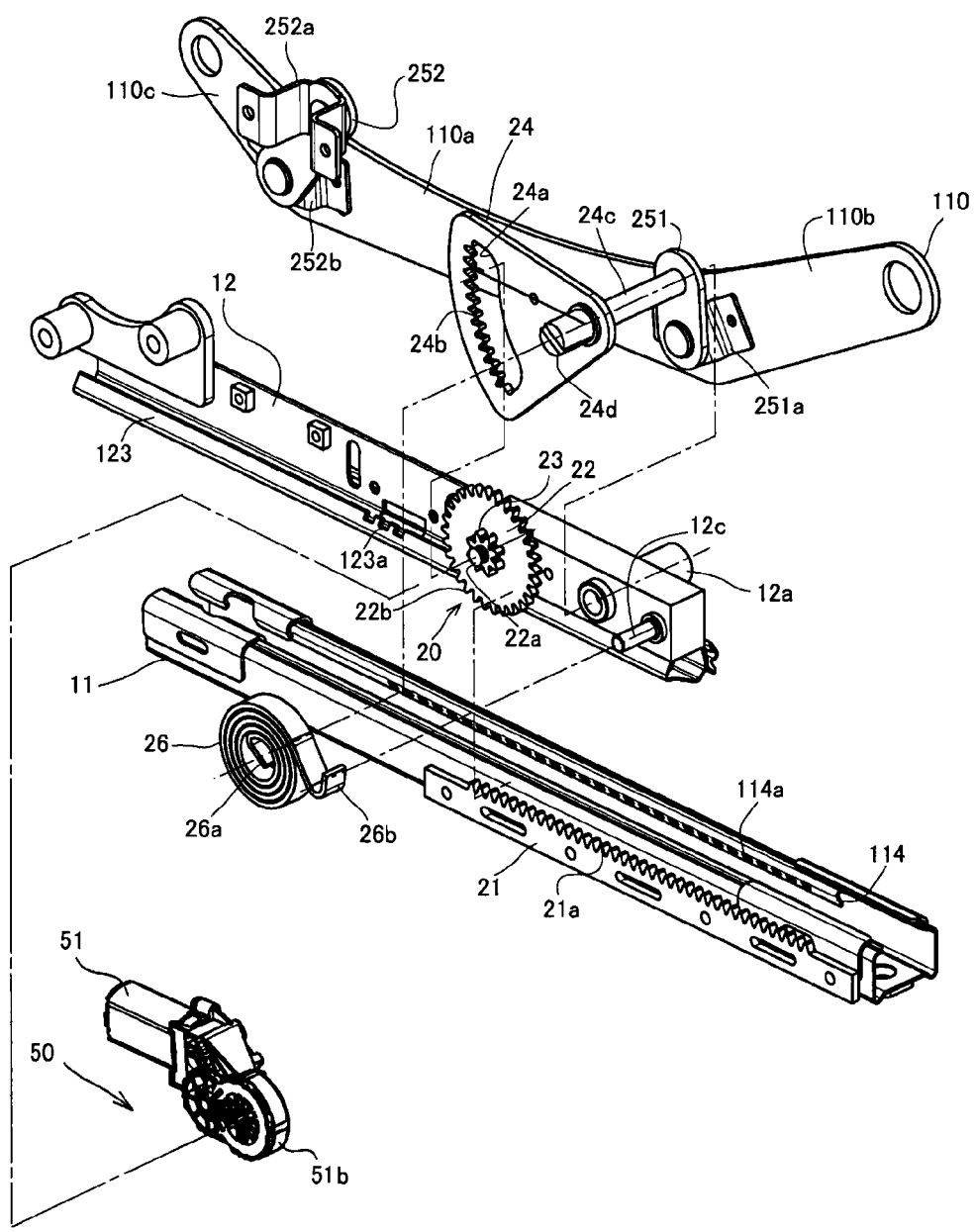
FIG. 4 is an exploded perspective view illustrating an example when a motor with which a gearbox is integrated is used as the electric mechanism in FIG. 3.

Further, the electric mechanism 50 may be composed of the motor 51 with a simple structure not including a speed reducer as illustrated in FIG. 3, or may be composed of a geared motor integrally including the speed reducer (gearbox 51b) as illustrated in FIG. 4. In the case where the electric mechanism 50 is composed of the geared motor, since the gearbox 51b is integrally included, it is possible in the electric mode to appropriately adjust the speed of the front-rear position adjustment or the like by the sliders 10, depending on the selection of the gear. On the other hand, in the case where the motor 51 is made to function as the damper in the manual mode, the torque becomes large because the gearbox 51b is integrally included, which makes it possible to obtain a large damping force when the motor 51 is made to function as the damper.

However, if the torque becomes too large, heavy manual operation is required for the front-rear movement. Therefore, it is necessary to carefully set a gear ratio of the gears of the gearbox 51b, but if the torque is suppressed, the operating speed at the time of the rearward movement is higher than at the time of the forward movement in the electric mode since the lower rails 11, 11 of the sliders 10, 10 are generally installed on the floor at a predetermined tilt angle, with their front ends being higher than their rear ends.

A measure for this point will be described in more detail in a later-described third embodiment.

FIG. 5 illustrates an example where the electric mechanism 50 is configured to further have the clutch 53 in addition to the motor 51 with the gearbox 51b. The gearbox 51b appropriately adjusts the speed of the front-rear position adjustment by the sliders 10 and the speed of the up-down position adjustment by the lifter 20, depending on the selection of the gear. The driving force of the motor 51 is appropriately reduced in speed by the gearbox 51b and then rotates the drive shaft 51a. The drive shaft 51a of the motor 51 is coupled to an input side of the clutch 53, and the torque of the motor 51 is transmitted to the clutch 53 via the drive shaft 51a. At an output side of the clutch 53, an input shaft 53b for pinion is disposed, and the pinion 22 rotates by the input shaft 53b for pinion being coupled to a rotation center of the pinion 22.

Therefore, in the electric mode, when the motor 51 rotates, its torque is transmitted to the input side of the clutch 53 via the gear selected in the gearbox 51b and the drive shaft 51a. The aforesaid torque transmitted to the input side of the clutch 53 is transmitted to the output side to rotate the pinion 22 via the input shaft 53b for pinion. The movement thereafter is the same as that in the example illustrated in FIG. 3.

In the structure in FIG. 5, the torque of the motor 51 is transmitted to the pinion 22 via the clutch 53. Therefore, when the motor 51 is in the energized state, the torque of the motor 51 is transmitted to the pinion 22 via the clutch 53, whether the torque is in the forward direction or the reverse direction, but when the motor 51 is in the non-energized state, since the clutch 53 enters a cut-off mode, the torque is not transmitted from the pinion 22 side to the motor 51. The use as the manual mechanism as described above is of course possible when the motor 51 is in the non-energized state, but in this case, the damping force of the motor 51 does not function. Therefore, the aforesaid manual adjustment is performed without the movement of the upper rails 12, 12 being buffered. Incidentally, in order to suppress the movement of the upper rails 12, 12 in this example, a separate damper such as an oil damper is disposed. In this respect, the above-described example using the damping force of the motor 51 is more preferable because it contributes to structure simplification and cost reduction.

Next, the operation when the cushion frame 100 makes the up-down movement in conjunction with the front-rear movement of the upper rails 12, 12 by the operation of the slide control mechanism 20 will be described. It is assumed that, in the sliders 10, 10, the upper rails 12, 12 are located at the rear ends of the lower rails 11, 11 as illustrated in FIG. 6(a). In this state, the front links 251, 251 have the vertical posture or the posture tilting relatively to the vertical state with their lower portion sides being slightly forward. The rear links 252, 252 have the posture tilting relatively to the vertical state, with their lower portion sides being slightly rearward.

First, irrespective of the electric operation or the manual operation, it is assumed that the seat cushion including the cushion frame 100 and the cushioning member and so on disposed on the upper portion of the cushion frame 100 try to move forward. Then, the upper rails 12, 12 move forward (direction of the arrow (A) in FIG. 2) relatively to the lower rails 11, 11 since the upper rails 12, 12 of the sliders 10, 10 are coupled to the side frames 110, 110 of the cushion frame 100 forming the seat cushion.

Figure 6:
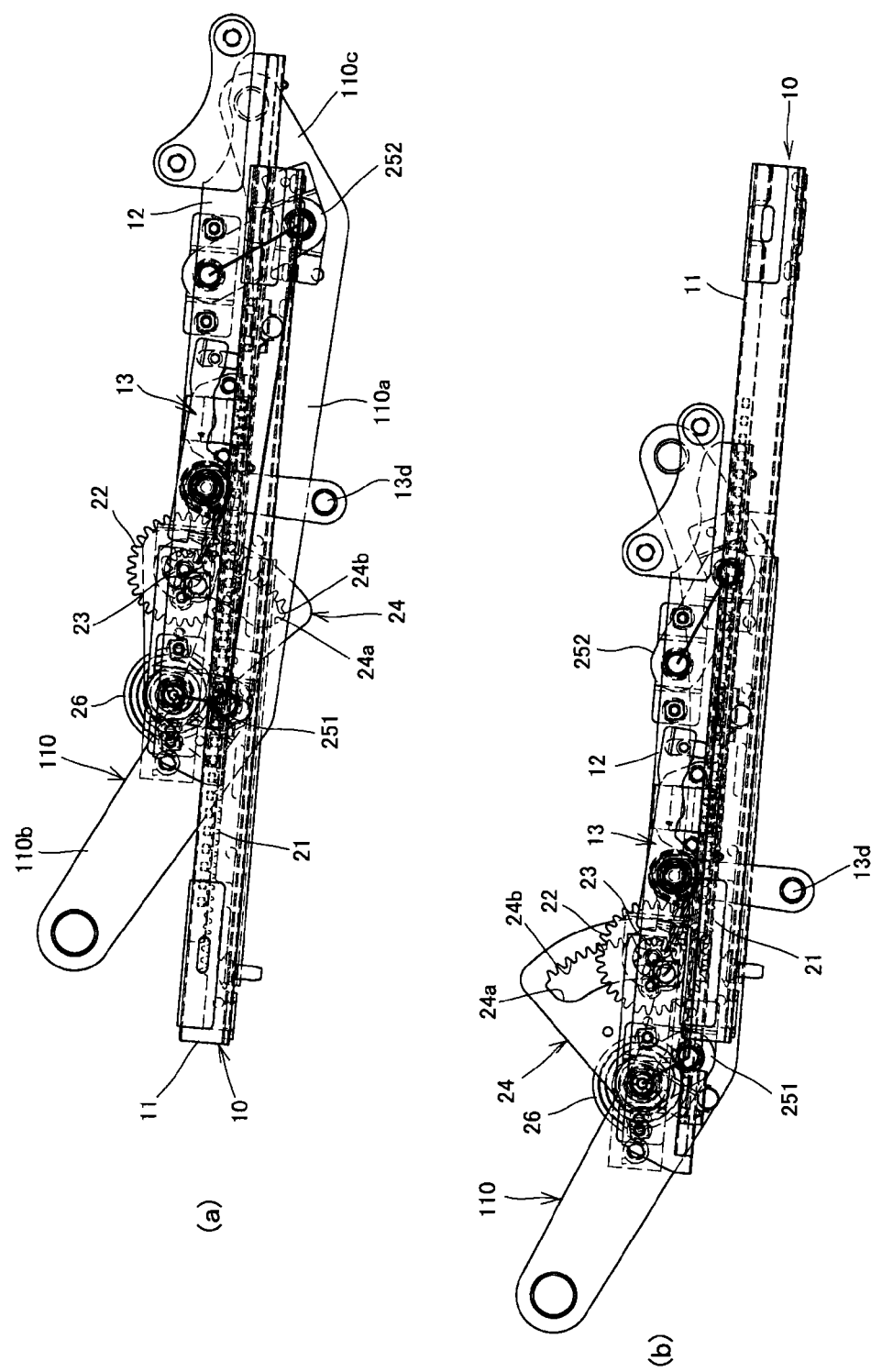
FIGS. 6(a) and (b) are explanatory views of the operation of the above first embodiment, FIG. 6(a) being a view illustrating a state where upper rails are located at rear ends of lower rails and a cushion frame is located at a lower limit, and FIG. 6(b) being a view illustrating a state where the upper rails are located at front ends of the lower rails and the cushion frame is located at an upper limit.

As the upper rails 12, 12 move forward, the pinion 22 pivotally supported on the right upper rail 12 in this embodiment rolls forward (rolls in the direction of the arrow (B) in FIG. 2) along the longitudinal direction of the rack 21 since the teeth 22b of the pinion 22 are in mesh with the teeth 21a of the rack 21. Consequently, the up-down movement relay gear 23 supported on the shaft part 22a of the pinion 22 also rolls forward. When the up-down movement relay gear 23 rolls forward, the lift gear 24 in mesh with the up-down movement relay gear 23 rotates. The lift gear 24 is set so that the up-down movement relay gear 23 is located at the uppermost side of the arc-shaped teeth 24b while being in mesh therewith, when the upper rails 12 exist at the rear end position as illustrated in FIG. 6(a). Accordingly, when the up-down movement relay gear 23 rolls forward in accordance with the forward movement of the upper rails 12 as described above, the lift gear 24 pivots anticlockwise in FIG. 2 and FIG. 6 (direction of the arrow (C) in FIG. 2) about the power transmission shaft 24c being the rotation center.

When the lift gear 24 pivots anticlockwise in FIG. 2 and FIG. 6, the upper portion of the right front link 251 pivots forward (anticlockwise in FIG. 2 and FIG. 6 (the direction of the arrow (D) in FIG. 2)), with the lower portion pivotally supported on the right side frame 110 serving as a fulcrum. The left front link 251 is only pivotally supported between the left upper rail 12 and side frame 110, and therefore its upper portion pivots forward with its lower portion serving as a fulcrum, in synchronization with the movement of the right front link 251. The rear links 252, 252 are both only pivotally supported between the upper rails 12, 12 and the side frames 110, 110, and therefore follow the movement of the front links 251, 251. Specifically, when the upper rails 12, 12 exist at the rear end positions of the lower rails 11, 11, the rear links 252, 252 have the posture tilting relatively to the vertical posture at a slight angle with their lower portions being rearward (refer to FIG. 6(a)), but the lower portions further pivot anticlockwise (direction of the arrow (E) in FIG. 2) when the upper rails 12, 12 move forward, so that the rear links 252, 252 become more horizontal (refer to FIG. 6(b)).

FIG. 6(b) illustrates a state where the upper rails 12, 12 are located at the front ends of the lower rails 11, 11, and as illustrated in this drawing, the front links 251, 251 and the rear links 252, 252 all displace anticlockwise in the drawing, that is, in a direction in which they come to have postures closer to the horizontal postures, as compared with the case where the the upper rails 12, 12 are at the rear end positions as in FIG. 6(a). At this time a height difference of the lower portions of the front links 251, 251 is an up-down direction displacement amount of the vicinities of the boundaries between the center plate parts 110a, 110a and the front plate parts 110b, 110b of the side frames 110, 110 on which the front links 251, 251 are pivotally supported, and a height difference of the lower portions of the rear links 252, 252 is an up-down direction displacement amount of the vicinities of the boundaries between the center plate parts 110a, 110a and the rear plate parts 110c, 110c of the side frames 110, 110 on which the rear links 252, 252 are pivotally supported. In this embodiment, since the up-down direction displacement amount of the lower portions of the front links 251, 251 is smaller than the up-down direction displacement amount of the lower portions of the rear links 252, 252 as described above, the seating surface angle in the case of the front end and the upper limit position illustrated in FIG. 6(b) is smaller than in the case of the rear end and the lower limit position illustrated in FIG. 6(a) (refer to FIG. 2).

Here, the elastic member 26 formed of the spiral spring is disposed between the right upper rail 12 and side frame 110 as described above, and therefore, when the lift gear 24 pivots anticlockwise in FIG. 2 and FIG. 6, its torque is assisted, so that the cushion frame 100 can be easily lifted up.

Incidentally, when the upper rails 12, 12 move rearward relatively to the lower rails 11, 11 (move in a direction opposite the direction of the arrow (A) in FIG. 2), the pinion 22, the up-down movement relay gear 23, and the lift gear 24 rotate in a direction opposite the above, so that the cushion frame 100 displaces in the direction from the front end and upper limit position illustrated in FIG. 6(b) toward the rear end and lower limit position illustrated in FIG. 6(a) and its seating surface angle increases.

Incidentally, in the electric mode, the front-rear slide operation and the up-down movement are interlocked in this embodiment, and therefore, when the pinion 22 rolls forward, the up-down movement relay gear 23 formed of a worm also rolls in the same direction to pivot the lift gear 24 on the power transmission shaft 24c and displace the pair of front links 251, 251 and the pair of rear links 252, 252 of the link mechanism 25 in the direction in which the positions of their lower portions become higher, so that the cushion frame 100 is lifted up. When the motor 51 rotates in the direction opposite the above, the drive shaft 51a, the pinion 22, the up-down movement relay gear 23, and the lift gear 24 all rotate in the direction opposite the above, so that the cushion frame 100 is lowered.

FIG. 9 to FIG. 13 are views illustrating a power seat slide device 1 according to a second embodiment of the present invention, and this power seat slide device 1 is different from that of the above-described first embodiment in the structure of a slide control mechanism 200, but the other structure is completely the same. Further, the slide control mechanism 200 is the same as the slide control mechanism 20 of the above-described first embodiment in that it includes a rack 201, a pinion 202, an up-down movement relay gear 203, a lift gear 204, a link mechanism 205, and an elastic member 206, but is different in the structures of the rack 201, the pinion 202, the up-down movement relay gear 203, and the lift gear 204. Therefore, what are different are mainly described in the below.

Figure 11:
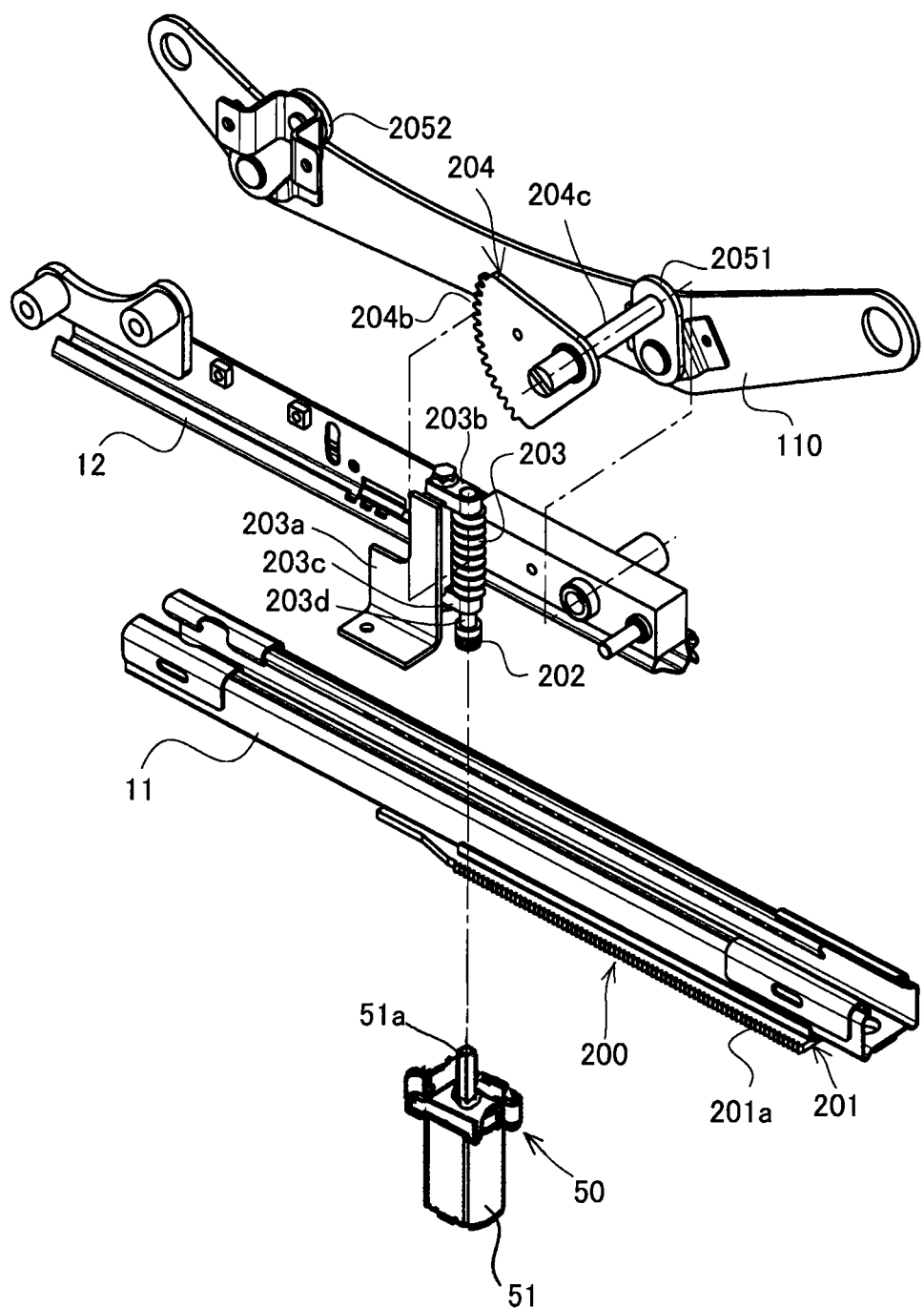
FIG. 11 is an explanatory exploded perspective view of the structure of a slider in FIG. 9 and an electric mechanism.

The rack 201 is the same as that of the above-described first embodiment in that it is disposed along an outer side surface of one of lower rails 11 (in this embodiment, a width-direction right side of a seat cushion), but in this embodiment, it is attached so that its teeth 201a protrude outward from a bottom surface of the lower rail 11, that is, its teeth 201a are directed horizontally in a plane view (refer to FIG. 11).

The pinion 202 is disposed so as to rotate in a substantially horizontal direction while being in mesh with the horizontally directed teeth 201a of the rack 201. The up-down movement relay gear 203 is formed of a worm disposed along a direction substantially perpendicular to a longitudinal direction of a slider 10. An attachment bracket 203a is disposed at a position closer to a front edge end than a longitudinal-direction center portion of one of upper rails 12, and an upper end portion and a lower end portion of the up-down movement relay gear 203 formed of the worm are supported on arms 203b, 203b which are disposed on both end portions of the bracket 203a so as to project forward. Consequently, the up-down movement relay gear 203 formed of the worm is disposed along an up-down direction substantially perpendicular to the longitudinal direction of the upper rail 12 and is rotatable in a circumferential direction. The aforesaid pinion 202 is attached to the lower end portion 203d of the up-down movement relay gear 203 formed of the worm.

The lift gear 204 is formed of a worm wheel in a substantially fan shape meshed with the up-down movement relay gear 203 formed of the worm, and one end of a power transmission shaft 204*c* is coupled to a rotation center of the lift gear 204 as in the above-described first embodiment. The other end of the power transmission shaft 204*c* is coupled to one of front links 2051 of a link mechanism 205 as in the above-described embodiment. Incidentally, that the link mechanism 205 includes the pair of front links 2051, 2051 and a pair of rear links 2052, 2052 is the same as in the above-described first embodiment, and further the structure of an elastic member 206 formed of a spiral spring is also the same as that of the above-described first embodiment.

This embodiment is set in such a manner that, in order for the cushion frame 100 to be at a lower limit position when the upper rails 12, 12 are at a rear end position, teeth of the lift gear 204 near an upper end, out of its arc-shaped teeth 204*b*, are meshed with the vicinity of an upper end of the up-down movement relay gear 203 formed of the worm. When the upper rails 12, 12 move forward relatively to the lower rails 11, 11 (move in the direction of the arrow (A) in FIG. 10) in this state, the pinion 202 in mesh with the teeth 201*a* of the rack gear 201 rotates anticlockwise (the direction of the arrow (B) in FIG. 10) in a plane view. In accordance with the rotation of the pinion 202, the up-down movement relay gear 203 formed of the worm also rotates anticlockwise (the direction of the arrow (B) in FIG. 10) in a plane view. When the up-down movement relay gear 203 thus rotates, the lift gear 204 whose arc-shaped teeth 204*b* are in mesh with the up-down movement relay gear 203 pivots anticlockwise in FIG. 8 (the direction of the arrow (C) in FIG. 10) about the power transmission shaft 204*c*. At this time, since an upward biasing force by the elastic member 206 acts, as the lift gear 204 pivots, the pair of front links 2051, 2051 and the pair of rear links 2052, 2052 of the link mechanism 205 displace in directions (the directions of the arrows (D), (E) in FIG. 10) in which positions of their lower portions become higher, so that the cushion frame 100 is lifted up as in the above-described first embodiment. A change of a seating surface angle at this time is set smaller when the cushion frame 100 is at the upper limit position than when it is at the lower limit position, which is also the same as in the above-described first embodiment.

Figure 10:
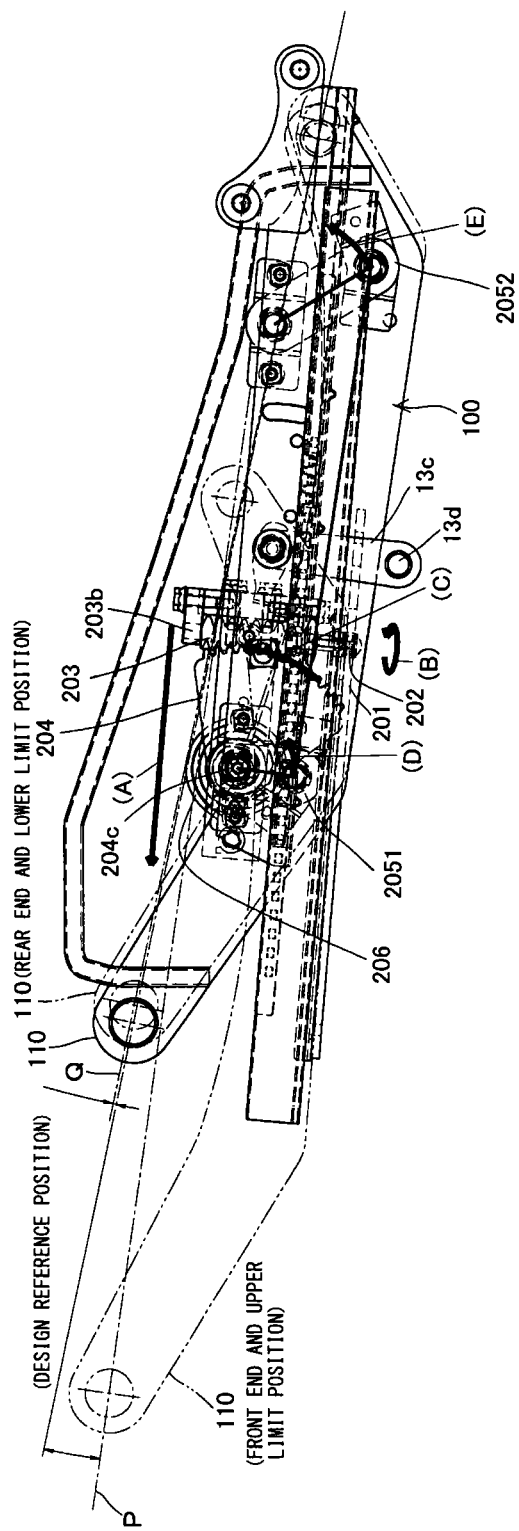
FIG. 10 is a side view of FIG. 9.

Incidentally, when the upper rails 12, 12 move rearward (move in a direction opposite the direction of the arrow (A) in FIG. 10) relatively to the lower rails 11, 11, the pinion 202, the up-down movement relay gear 203, and the lift gear 204 rotate in directions opposite the aforesaid directions, and the cushion frame 100 gradually displaces in a direction from the front end and upper limit position toward the rear end and lower limit position and gradually has a larger seating surface angle.

In the case of this embodiment, the worm is adopted as the up-down movement relay gear 203, and the worm wheel is adopted as the lift gear 204. Accordingly, since a self-lock function of a worm gear mechanism works, an input from a seat cushion side including the cushion frame 100 does not rotate the up-down movement relay gear 203 formed of the worm via the lift gear 204 formed of the worm wheel, which hinders the transmission of the force to the sliders 10, 10. Therefore, at the time of lock release of the sliders 10, 10 by lock mechanisms 13, 13, it is possible to prevent unintentional actuation ascribable to elasticity of the elastic member 26.

Incidentally, the structure of an electric mechanism 50 in this embodiment is also the same as that of the above-described first embodiment. That is, in FIG. 11, a motor 51 is used as the electric mechanism 50, and its drive shaft 51*a* is coupled to a rotation shaft of the pinion 202. Therefore, when the motor 51 is in an energized state, the use in an electric mode is possible, and when the motor 51 is in a non-energized state, the upper rails 12, 12 can be manually moved forward and rearward. Incidentally, at the time of the manual front-rear movement in the non-energized state, the drive shaft 51*a* side of the motor 51 rotates, and an electromagnetic force generated by this can suppress the rotation of the pinion 202 and the movement of the upper rails 12, 12. This point is the same as in the example illustrated in FIG. 1 to FIG. 4 where the clutch 53 is not adopted, in the above-described embodiment.

Figure 12:
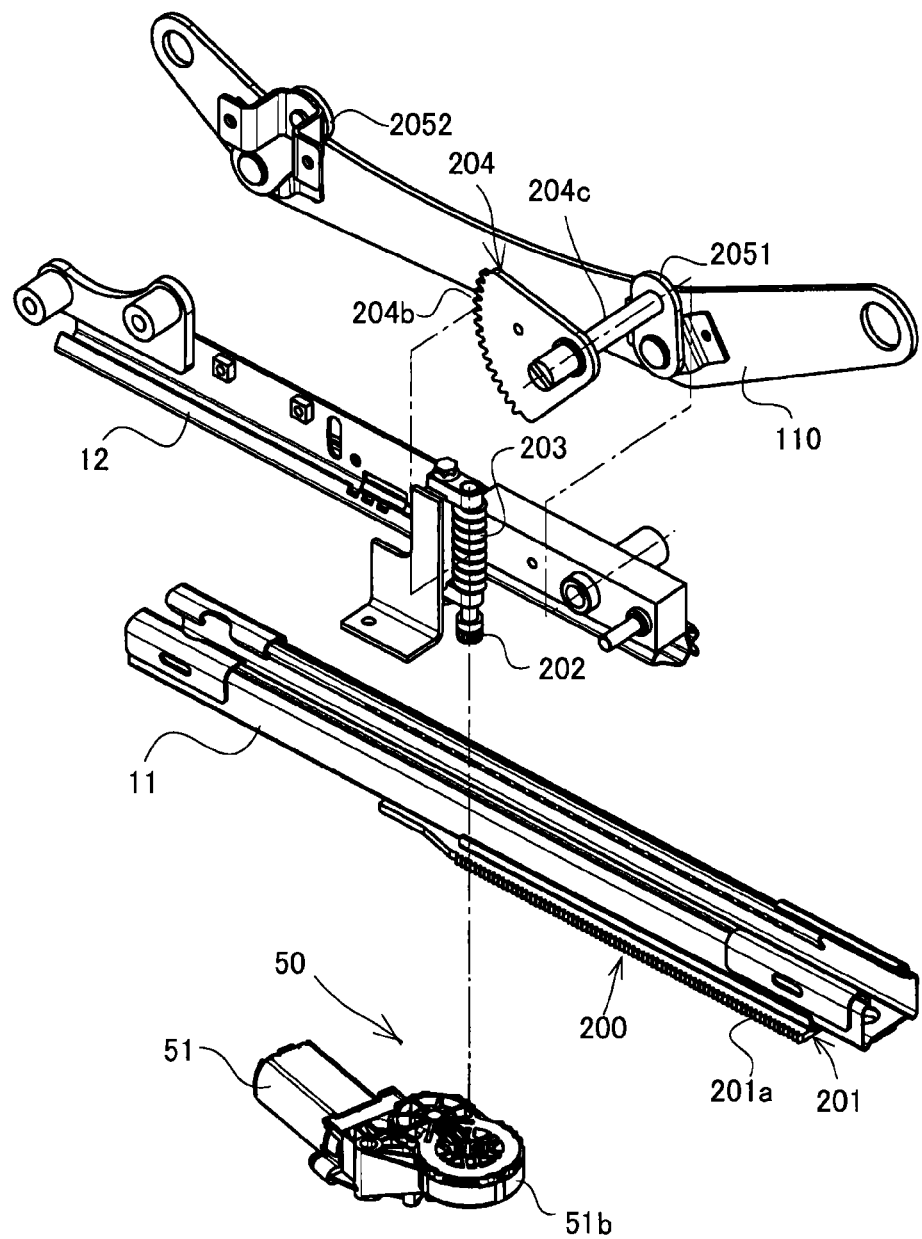
FIG. 12 is an exploded perspective view illustrating an example when a motor with which a gearbox is integrated is used as the electric mechanism in FIG. 11.
Figure 13:
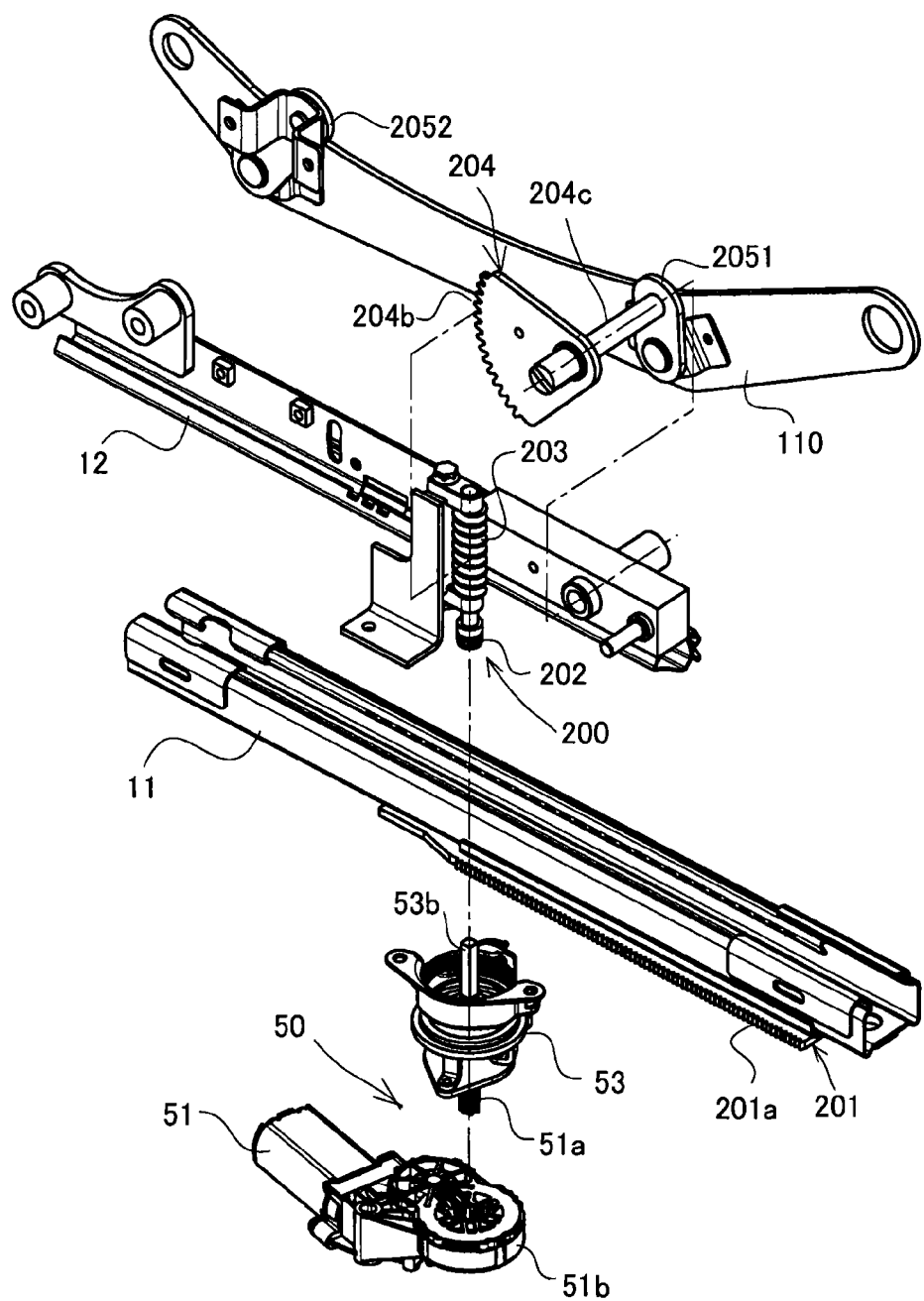
FIG. 13 is an exploded perspective view illustrating an example when a clutch is further used as the electric mechanism in FIG. 12.

FIG. 12 illustrates a structure when a motor 51 formed of a geared motor with which a gearbox 51*b* is integrated is used as the electric mechanism 50, FIG. 13 illustrates a structure in which one further having a clutch 53 in addition to the motor 51 and the gearbox 51*b* is used as the electric mechanism 50, and their operation and effect are the same as those in the examples illustrated in FIG. 4 and FIG. 5 in the above-described first embodiment.

Incidentally, in the case of the above-described first and second embodiments, the front-rear position adjustment, the height adjustment, and the seating surface angle adjustment of the seat cushion including the cushion frame 100 can be performed in conjunction with a single operation of the lock release operation of the sliders 10, 10 by the lock mechanisms 13, 13, but it goes without saying that the power seat slide device having the structure capable of operating both in the electric mode and the manual mode is applicable to a case where only a front-rear position adjustment mechanism is provided without an interlocking mechanism with the lifter, that is, to a case where it only moves the upper rails 12, 12 forward and rearward relatively to the lower rails 11, 11.

Figure 14:
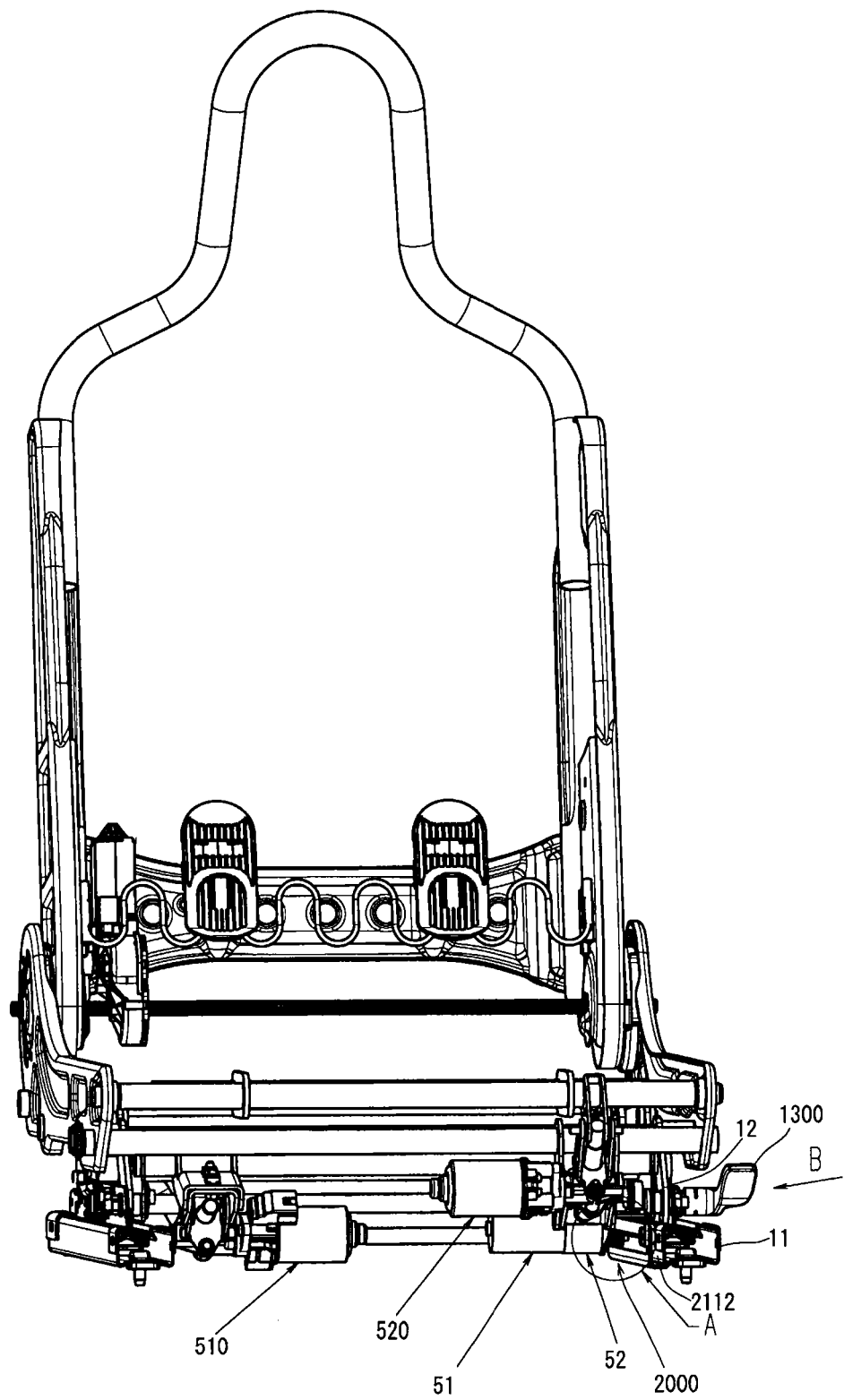
FIG. 14 is a perspective view illustrating a power seat slide device according to a third embodiment of the present invention and a cushion fame of a seat cushion supported on the power seat slide device.
Figure 15:
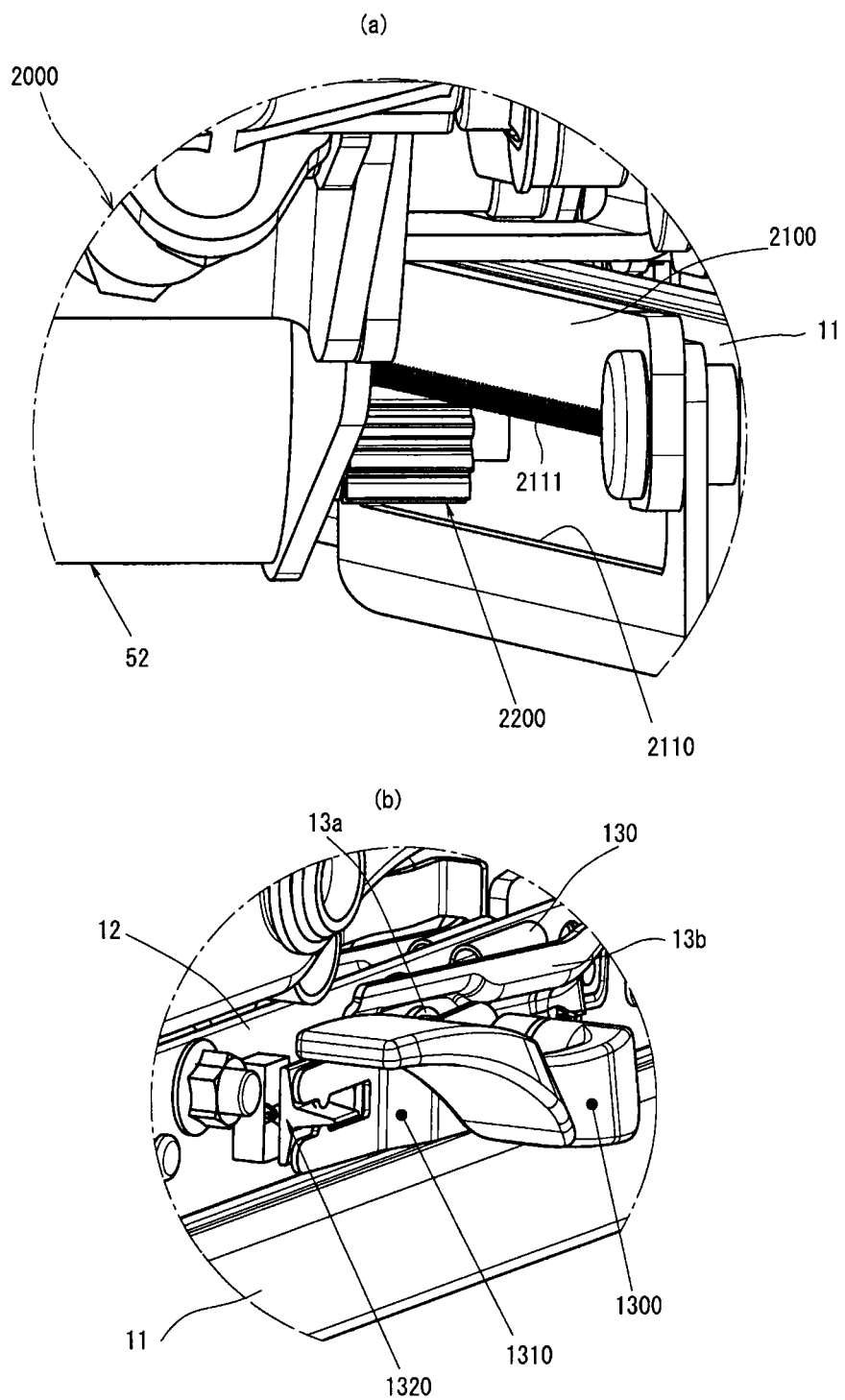
FIG. 15(a) is a detail view of an A portion in FIG. 14.
FIG. 15(b) is a detail view of a B portion in FIG. 14.
Figure 16:
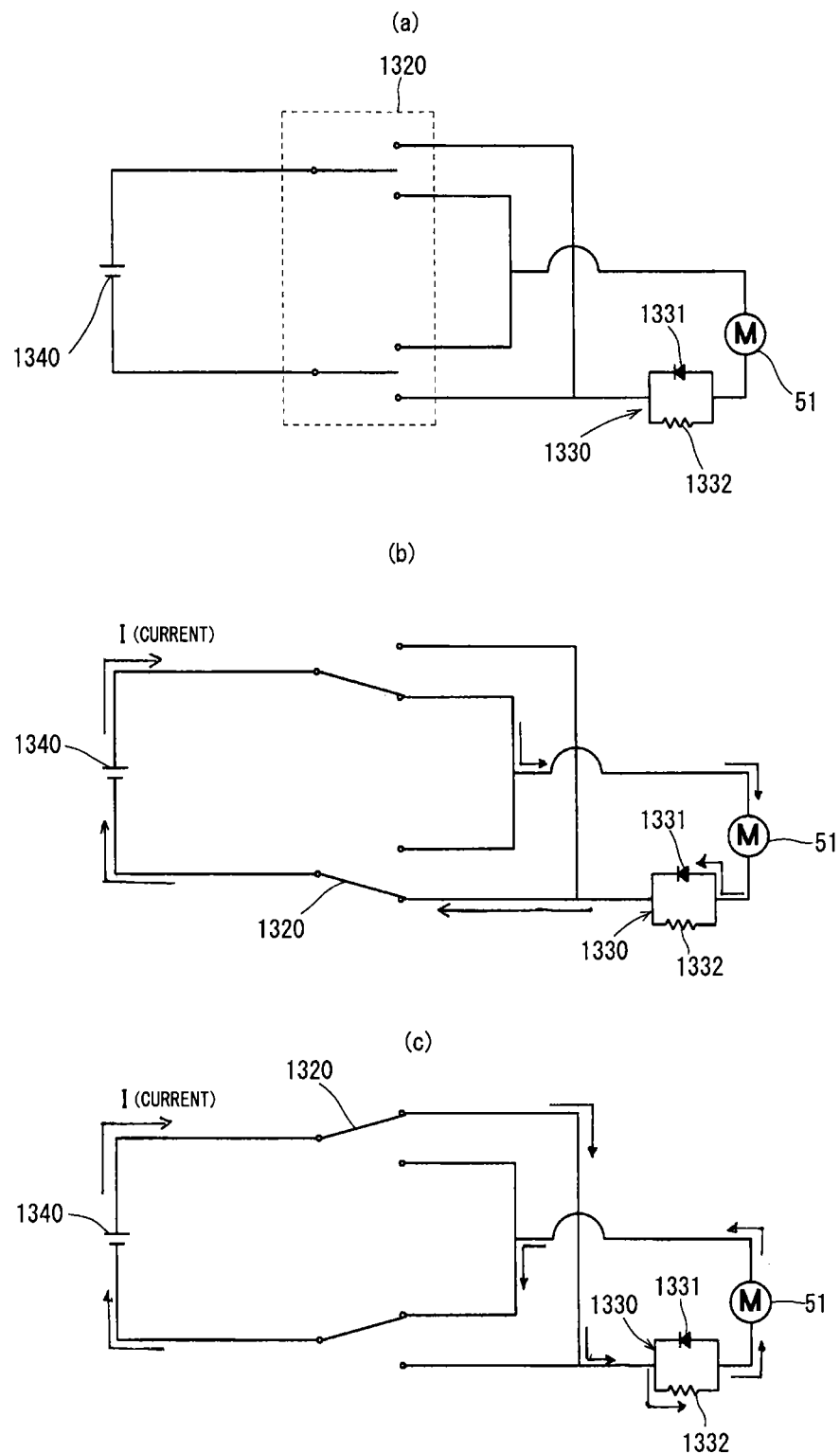
FIG. 16(a) is a diagram illustrating a control circuit of the power seat slide device in FIG. 14, FIG. 16 (b) is a diagram illustrating a flow of a current at the time of forward movement, and FIG. 16 (c) is a diagram illustrating a flow of the current at the time of rearward movement.

FIG. 14 to FIG. 16 are views illustrating a third embodiment of the present invention, and this embodiment illustrates an example where lower rails 11, 11 are disposed on a floor of a vehicle at a tilt angle, with their front ends being higher and their rear ends being lower. Incidentally, in the slide control mechanisms 20, 200 of the above-described embodiments, the front-rear position adjustment mechanism and the up-down position adjustment mechanism are interlocked, but it is optional whether or not they are interlocked, and a slide control mechanism 2000 of this embodiment functions only as a front-rear position adjustment mechanism, and is formed independently of an up-down position adjustment mechanism. Therefore, there are provided a motor 510 for the up-down position adjustment mechanism and a motor 520 for a tilt angle adjustment mechanism, separately from a motor 51 for the front-rear position adjustment mechanism.

In the slide control mechanism 2000 of this embodiment, a rack 2100 is disposed on one of lower rails 11, which is the same as in the above-described embodiments, but in this embodiment, in the rack 2100, a long hole 2110 extending in its longitudinal direction is formed as illustrated in FIG. 15(*a*). Teeth 2111 are incised on an upper edge of the long hole 2110. That is, the teeth 2111 of the rack 2100 are formed to be directed downward, unlike the above-described embodiments.

The rack 2100 is formed to have a substantially L-shaped cross section and is attached to a side surface of the lower rail 11. More specifically, since it is formed in the substantially L shape, there is a gap 2112 between its surface in which the long hole 2110 is formed and the side surface of the lower rail 11, and a pinion 2200 is disposed so as to be inserted in the long hole 2110 and be in mesh with the teeth 2111.

A gearbox 51b is attached to the motor 51, the pinion 2200 is attached to its output shaft, and the pinion 2200 rotates in accordance with the rotation of the motor 51.

In this embodiment, as illustrated in FIG. 15(b), an operation lever 1300 is coupled to a shaft part 13a of a release member 13b of a lock mechanism 13, and when the operation lever 1300 is operated, the release member 13b pivots to cause lock release. On the operation lever 1300, a switch lever 1310 is disposed which also pivots about the shaft portion 13a at this time and moves in synchronization with the operation lever 1300. On the side surface of the lower rail 11, a slide switch 1320 which controls on/off of the motor 51 is disposed at a position corresponding to the switch lever 1310, and when the switch lever 1310 pivots up and down, the slide switch 1320 is turned on and off.

This embodiment is set so that, when the operation lever 1300 is at the locked state position of the lock mechanism 13, the switch lever 1310 is located at a position where it keeps the slide switch 1320 in the off state, and when the operation lever 1300 is moved up or down, the lock of the lock mechanisms 13 is released whether the movement is in the upward direction or the downward direction, and when the switch lever 1310 moves up or down in accordance with this, the slide switch 1320 turns on whether the movement is in the upward direction or the downward direction, so that the motor 51 is driven. This embodiment is set so that, when the operation lever 1300 and the switch lever 1310 are moved up, the motor 51 is driven to rotate in such a direction as to move the upper rails 12 rearward relatively to the lower rails 11, and when the operation lever 1300 and the switch lever 1310 are operated downward, the motor 51 is driven to rotate in such a direction as to move the upper rails 12 forward relatively to the lower rails 11. Of course, this is only an example, and the setting may be made in an opposite way.

Here, in a non-energized state such as the engine off time, the manual operation is possible since the motor 51 is kept off even during the unlocked period, which is the same as in the above-described embodiments. However, if a torque during the manual operation is suppressed by adjusting the setting of a gear ratio of gears of the gearbox 51b so as to enable the manual adjustment during the non-energized period, the case where the lower rails 11, 11 of the sliders 10, 10 are installed on the floor at a predetermined tilt angle with their front ends being higher than their rear ends has a problem in the electric mode that, at the time of rearward movement, a seat weight and a person's load are applied and thus the operation speed becomes higher than at the time of forward movement as described above. Therefore, in this embodiment, even when the gear ratio is reduced, it is possible to control the motor 51 by a control circuit 1330 which is capable of setting the operation speeds at the time of the forward movement and at the time of the rearward movement in the electric mode equal.

This control circuit 1330 is, as illustrated in FIG. 16(a), is formed of a parallel circuit disposed between a power source 1340 of the vehicle and the motor 51 and composed of a diode 1331 being a rectifying element and a resistor 1332, and is set so as to be forward biased when a current which has passed through the motor 51 flows in the diode 1331, and a direction in which the current flows to the control circuit 1330 is changed by the aforesaid slide switch 1320.

In this embodiment, when the operation lever 1300 is operated in the downward direction, the slide switch 1320 performs the switching so as to rotate the motor 51 in one direction. At this time, as indicated by the arrows in FIG. 16(b), the direction of the current is switched so that the current flows in the motor 51 side first before flowing in the control circuit 1330. When the current flows first in the motor 51, the forward bias is produced, so that the current flows via the diode 1331 and performs the forward operation with a predetermined current value.

On the other hand, when the operation lever 1300 is operated in the upward direction, the slide switch 1320 performs the switching so as to rotate the motor 51 in the opposite direction. At this time, the current flows first in the control circuit 1330 side as indicated by the arrows in FIG. 16(c). Therefore, the diode 1331 is reverse-biased, and the current flows in the resistor 1332 and thereafter is supplied to the motor 51. Therefore, at the time of the rearward movement, the current value decreases to reduce the operation speed. Consequently, though the operation speed is likely to become higher at the time of the rearward movement due to the application of the seat weight and the person's weight in the case where the tilt angle is made so that the front end becomes higher than the rear end, the aforesaid control circuit 1330 controls the current supply in the rearward movement direction and as a result the operation speeds of the forward movement and the rearward movement can be stabilized at a substantially equal value.

FIG. 17 to FIG. 21 are views illustrating essential parts of a fourth embodiment of the present invention. This embodiment is characterized in adopting a clutch 530 with a new structure. Similarly to the cutch 53 illustrated in FIG. 5 of the above-described first embodiment, the clutch 530 is configured to transmit a torque from a motor 51 side to a pinion 22 side, whether the torque is in a forward direction or a rearward direction, but not to transmit a torque from the pinion 22 side (input counter torque) to the motor 51 side in a manual mode being a non-energized state.

Figure 17:
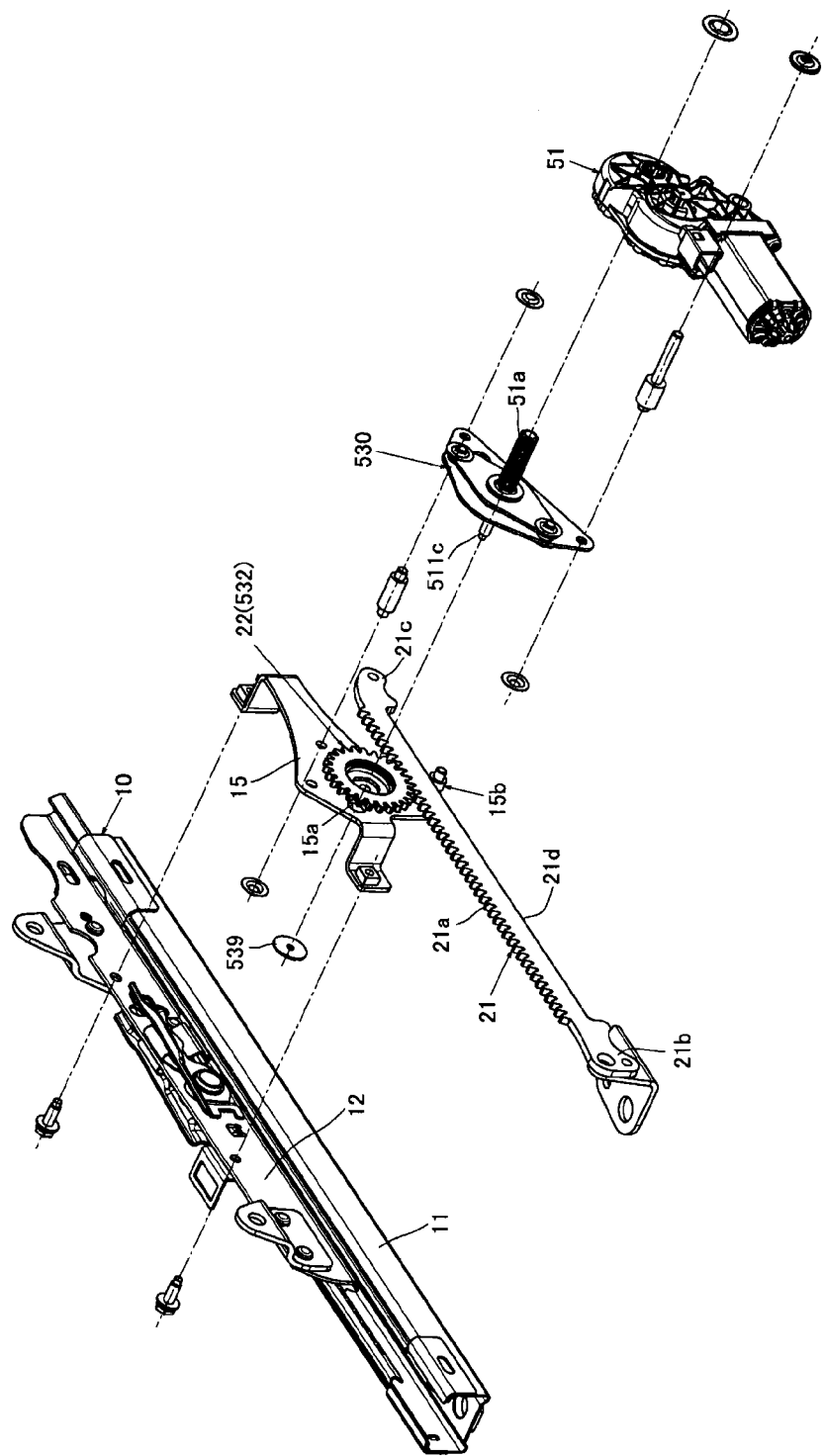
FIG. 17 is an exploded perspective view illustrating an essential part of a power seat slide device according to a fourth embodiment of the present invention.
Figure 18:
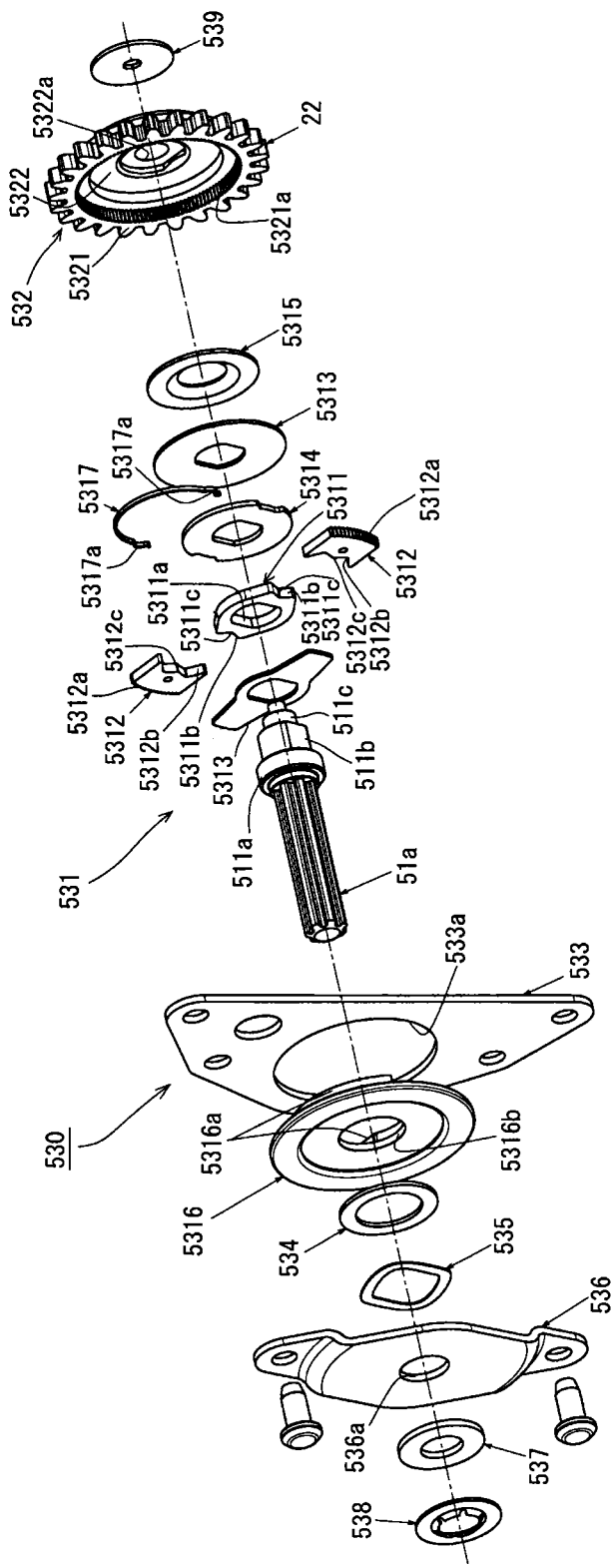
FIG. 18 is an exploded perspective view illustrating the structure of a clutch according to the fourth embodiment.
Figure 19:
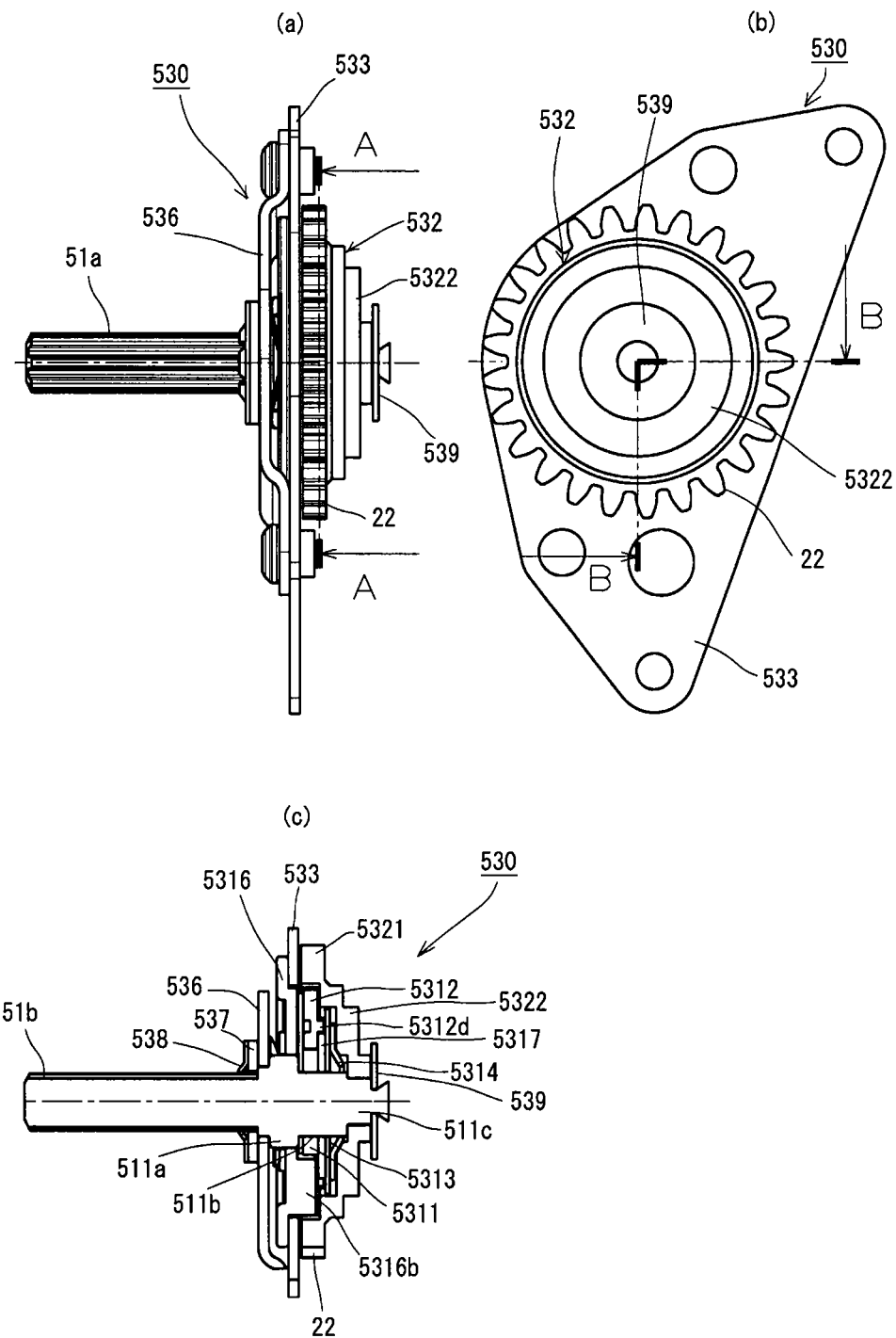
FIG. 19(a) is a side view of the clutch according to the fourth embodiment.
FIG. 19(b) is a view seen in an arrow A direction of FIG. 19(a)
FIG. 19(c) is a B-B sectional view in FIG. 19(b).

As illustrated in FIG. 17 and FIG. 18, a drive shaft 51a of the motor 51 and the pinion 22 are coupled to an input side and an output side of the clutch 530 respectively. Specifically, the clutch 530 includes an input-side torque transmitting member 531 and an output-side torque transmitting member 532 as illustrated in FIG. 18.

The input-side rotation transmitting member 531 includes a cam 5311 and a plurality of, in this embodiment, two plates 5312, 5312. The cam 5311 is formed in a plate shape and is formed to have a contour in a substantially elliptic shape in a plane view. Then, a fitting hole 5311a penetrating through the center of the cam 5311 and having, on its inner peripheral surface, two flat surfaces for rotation stop is formed, and this fitting hole 5311a is fit to portions corresponding to flat surfaces 511b formed at a tip side of the drive shaft 51a of the motor 51. Therefore, when the drive shaft 51a of the motor 51 rotates in either of forward and inverse directions, the cam 5311 also rotates.

The cam 5311 has cam-side tapered surfaces 5311b, 5311b formed on its outer peripheral surfaces facing each other in a major axis direction. The cam-side tapered surfaces 5311b are formed in a valley-like groove shape in a plane view, on the peripheral surfaces, of the substantially elliptic cam 5311, which face each other in the major axis direction.

The two plates 5312, 5312 are each formed of a plate-shaped member similarly to the cam 5311, and in this embodiment, are disposed across the major axis of the cam 5311. Outer peripheral surfaces of the plates 5312, 5312 are formed in a substantially arc shape and have input-side teeth parts 5312a, 5312a incised therein. On the other hand, on inner peripheral surfaces of the plates 5312, 5312, plate-side tapered surfaces 5312b, 5312b in a mountain shape in a plane view are formed in this embodiment. The plate-side tapered surfaces 5312b, 5312b in the mountain shape are formed so that their slopes and slopes of the cam-side tapered surfaces 5311b, 5311b in the valley shape of the cam 5311 can face each other.

Owing to such formation, in a positional relation where bottom portions 5311c of the grooves of the cam-side tapered surfaces 5311b, 5311b of the cam 5311 and apex portions 5312c of the plate-side tapered surfaces 5312b, 5312b of the plates 5312, 5312 face straight each other, the both are in the deepest engagement state, which is a state where the distance between the input-side teeth part 5312a formed on the outer peripheral surface of one of the plates 5312 and the input-side teeth part 5312a formed on the outer peripheral surface of the other plate 5312 is shortest. Therefore, when the cam 5311 rotates even slightly from this state to either the left or the right, the distance between the facing input-side teeth parts 5312a, 5312a becomes longer. That is, the rotation of the cam 5311, whether it is in the left direction or the right direction, displaces the plates 5312, 5312 in a radial direction.

Further, retainer members 5313, 5313 are disposed in front of and at the back of the cam 5311 and the plates 5312, 5312 in terms of an axial direction, that is, disposed in both directions across the cam 5311 and the plates 5312, 5312, and the plates 5312, 5312 are retained between the pair of retainer members 5313, 5313 so as to be displaceable in the radial direction. Note that the reference sign 5314 denotes a spacer disposed between one of the retainer members 5313, and the cam 5311 and the plates 5312, 5312, and the reference sign 5315 denotes a push nut disposed between this retainer member 5313 and an inner surface of the later-described output-side rotation transmitting member 532.

The drive shaft 51a of the motor 51 has a large-diameter portion 511a in the middle, and on a peripheral surface closer to an axial-direction tip side (pinion 22 side) than the large-diameter portion 511a, the flat surfaces 511b for rotation stop are formed as described above. To a periphery of the portion where the flat surfaces 511b for rotation stop are formed, one of the retainer members 5313, the fitting hole 5311a of the cam 5311, the spacer 5314, and the other retainer member 5313 are fit, and they are retained by the push nut 5315 between the large-diameter portion 511a and the output-side rotation transmitting member 532.

Figure 20:
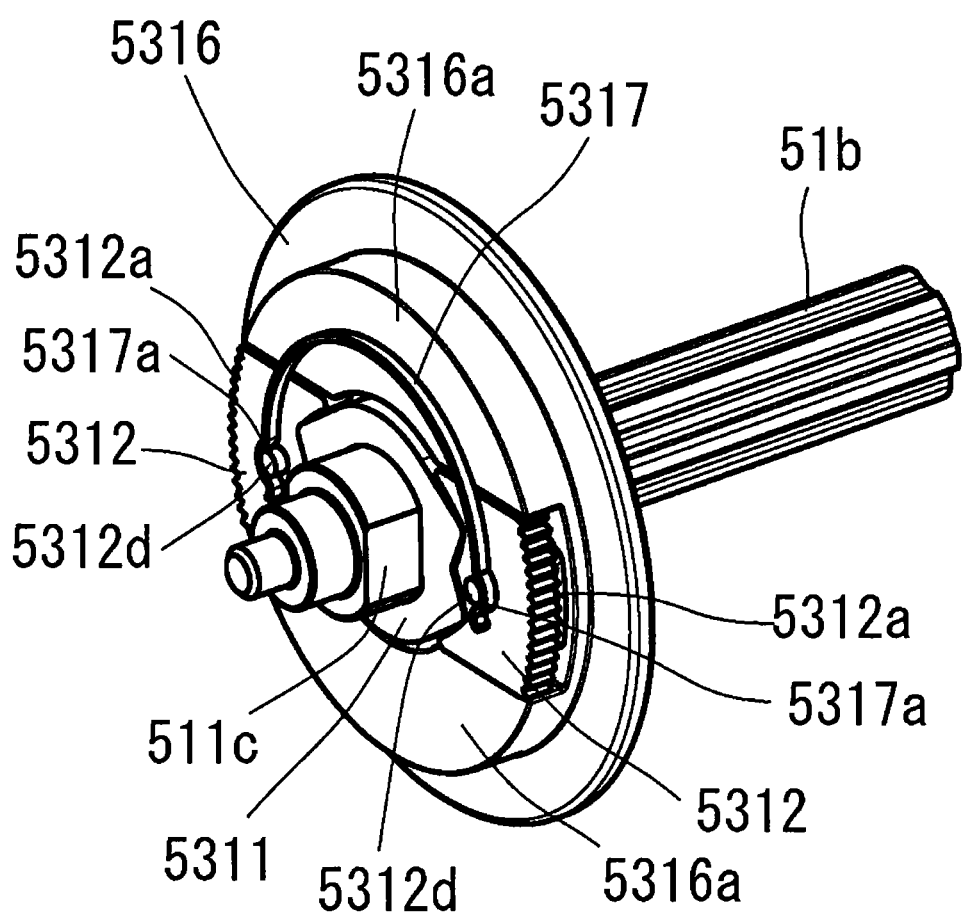
FIG. 20 is a perspective view illustrating the structures of plates, a cam, and a plate guide member of the clutch according to the fourth embodiment.

Further, the input-side rotation transmitting member 531 has a plate guide member 5316 on whose one surface a pair of guide pieces 5316a, 5316a guiding the radial-direction displacement of the plates 5312, 5312 are disposed to stand. As illustrated in FIG. 20, the pair of guide pieces 5316a, 5316a are formed in a semicircular shape at positions outside the outside diameter of the cam 5311, and are disposed so that the plates 5312, 5312 are located in a gap therebetween. Consequently, side surfaces of the plates 5312, 5312 are restricted by edges of the pair of guide pieces 5316a, 5316a to be guided in the radial direction.

The reference sign 533 denotes an attachment bracket, and at its substantially center portion, a through hole 533a is formed. On a surface, of the attachment bracket 533, located on the motor 51 side, the aforesaid plate guide member 5316 is disposed, its guide pieces 5316a, 5316a are disposed so as to protrude to the opposite surface side through the through hole 533a, and on this opposite surface side of the attachment bracket 533, the aforesaid cam 5311, plates 5312, 5312, and so on are disposed.

The plate guide member 5316 is fixedly disposed between the attachment bracket 533 and a fixed plate 536 fixed to the motor 51-side surface of the attachment bracket 533 via a washer 534 and a wave washer 535. At a substantially center portion of the plate guide member 5316, a shaft insertion hole 5316b is formed, and the drive shaft 51a is disposed and inserted so that its large-diameter portion 511a is located in the shaft insertion hole 5316b. A portion, of the drive shaft 51a, closer to an axial-direction rear end (motor 51 side) than the large-diameter portion 511a passes through a shaft insertion hole 536a of the fixed plate 536 to be positioned by a washer 537 and a push nut 538, and is rotatably attached.

The input-side rotation transmitting member 531 further has a biasing member 5317 which biases the pair of two plates 5312, 5312 in a direction in which they approach each other in the radial direction. That is, the biasing member 5317 is a spring formed of a wire member curved into a substantially semi-annular shape, and at its both end portions, engagement parts 5317a, 5317a having a shape bulging from an inner peripheral surface side toward an outer peripheral surface side are formed. The engagement parts 5317a, 5317a are engaged with pins 5312d, 5312d protrudingly disposed on one-side surfaces of the plates 5312, 5312. After the biasing member 5317 is radially stretched, its engagement parts 5317a, 5317a are engaged with the pins 5312d, 5312d, whereby the biasing member 5317 constantly biases, by its reactive force, the pair of two plates 5312, 5312 in the direction in which they approach each other in the radial direction.

The output-side rotation transmitting member 532 has an annular part 5321 including, on its inner peripheral surface, an output-side teeth part 5321a meshable with the aforesaid input-side teeth parts 5312a, 5312a, and a housing part 5322 in a substantially concave sectional shape formed integrally on one side of the annular part 5321. In an end wall of the housing part 5322, a shaft bearing hole 5322a is penetratingly formed. In this embodiment, as the output-side rotation transmitting member 532, an internal gear is used, and its internal teeth are used as the output-side teeth part 5321a.

The input-side rotation transmitting member 531 is disposed so that the cam 5311 and the plates 5312, 5312 are at a position corresponding to the annular part 5321, whereby the input-side teeth parts 5312a, 5312a become meshable with the output-side teeth part 5321a, and on the other hand, the input-side teeth parts 5312a, 5312a are normally apart from the output-side teeth part owing to an elastic force of the biasing member 5317. Further, the retainer members 5313, the push nut 5315, and so on of the input-side rotation transmitting member 531 are housed in the housing part 5322, the tip portion 511c of the drive shaft 51a penetrates through the shaft bearing hole 5322a to be supported by a retaining washer 539.

The output-side rotation transmitting member 532 is disposed so that its torque is transmitted to the pinion 22 meshed with a rack 21 attached to a lower rail 11, and in this embodiment, the annular part 5321 of the output-side rotation transmitting member 532 has external teeth on its outer peripheral surface, and the external teeth themselves are used as the pinion 22 meshed with the rack 21. Of course, the use of the external teeth themselves as the pinion 22 is only an example, and it is also possible that another gear or the like is combined with the external teeth, a gear ratio is appropriately adjusted, and this structure is disposed so that the torque is transmitted to the pinion 22 formed of a member independent of the output-side rotation transmitting member 532.

Here, at the time of the attachment to an upper rail 12, the tip portion 511c is inserted from a through hole 15a of an upper rail attachment bracket 15, and the washer 539 is coupled to the tip portion 511c at an opposite surface side as illustrated in FIG. 17. Consequently, the pinion 22 being the external teeth of the annular part 5321 (refer to FIG. 18) of the output-side rotation transmitting member 532 is meshed with the rack 21.

Further, a guide member 15b formed of a roller, a sliding member, or the like is disposed at a position which is on a lower portion of the upper rail attachment bracket 15 and at which it is abuttable on a surface, of the rack 21, where teeth 21a are not formed (in this embodiment, a lower surface 21d). Therefore, the rack 21 is sandwiched by the pinion 22 and the guide member 15b. Accordingly, when the upper rail 12 slides forward and rearward relatively to the lower rail 11, the guide member 15b moves while abutting on the lower surface 21d of the rack 21, which suppresses backlash between the pinion 22 and the rack 21 to make the movement of the pinion 22 smooth and accordingly also suppress the generation of noise.

Further, one end 21b of the rack 21 is fixed to the lower rail 11 and thus is a fixed end, and its other end 21c is a free end not fixed to the lower rail 11. Consequently, it is possible to absorb size variation of products such as the rack 21 and the pinion 22, which enables a stable operation and also contributes to the suppression of the generation of noise during the operation. Note that this point is the same also in a later-described structure where a lifter interlocking mechanism is provided (refer to FIG. 22).

Next the operation of this embodiment will be described.

First, during the non-energization period, since the torque of the drive shaft 51a of the motor 51 does not act, the pair of two plates 5312, 5312 are constantly biased by the biasing member 5317 in the direction in which they approach each other in the radial direction, and the plate-side tapered surfaces 5312b, 5312b in contact with the cam-side tapered surfaces 5311b, 5311b in the valley shape of the cam 5311 are in such a positional relation that the apex portions 5312c, 5312c of the plate-side tapered surfaces 5312a, 5312a face the bottom portions 5311c, 6311c of the grooves of the cam-side tapered surfaces 5311b, 5311b, as illustrated in FIG. 21(a). Therefore, the radial-direction distance between the input-side teeth part 5312a formed on the outer peripheral surface of one of the plates 5312 and the input-side teeth part 5312a formed on the outer peripheral surface of the other plate 5312 becomes shortest, and the input-side teeth parts 5312a, 5312a are out of mesh with the output-side teeth part 5321a of the output-side rotation transmitting member 532.

On the other hand, during the energization period, when the lock is released and the torque from the motor 51 side acts, whether its direction is the forward direction or the reverse direction, the drive shaft 51a rotates. The rotation of the drive shaft 51a causes the cam 5311 to rotate. When the cam 5311 rotates either to the left or the right even slightly, the plate-side tapered surfaces 5312b, 5312b in contact with the cam-side tapered surfaces 5311b, 5311b are pressed toward the outer peripheral sides along the cam-side tapered surfaces 5311b, 5311b, and the plates 5312, 5312 move toward the outer peripheral sides while being guided by the guide pieces 5316a, 5316a of the plate guide member 5316, so that the distance between the input-side teeth parts 5312a, 5312a becomes longer. As a result, as illustrated in FIG. 21(b), the input-side teeth parts 5312a, 5312a come into mesh with the output-side teeth part 5321a of the output-side rotation transmitting member 532.

When the input-side teeth parts 5312a, 5312a come into mesh with the output-side teeth part 5321a of the output-side rotation transmitting member 532, the output-side rotation transmitting member 532 rotates. The output-side rotation transmitting member 532 is connected so that its torque is transmitted to the pinion 22 as described above, and in this embodiment, since the external teeth formed on the output-side rotation transmitting member 532 are used as the pinion 22, the pinion 22 rotates in accordance with the rotation of the output-side rotation transmitting member 532. Since the pinion 22 is in mesh with the rack 21, the upper rails 12 move forward or rearward relatively to the lower rails 11 in the electric mode according to the rotation direction of the pinion 22, as in the above-described embodiments.

When the non-energization period is entered, the torque of the motor 51 does not act, but since the biasing member 5317 constantly biases the plates 5312, 5312 in the direction in which they approach each other in the radial direction as described above, the plates 5312, 5312 in the state where the torque of the motor 51 does not act return to the positional relation in FIG. 21(a), and the input-side teeth parts 5312a, 5312a become out of mesh with the output-side teeth part 5321a.

When the front-rear movement of the upper rails 12 is caused by releasing the lock in this state, its torque (input counter torque) rotates the pinion 22 (in this embodiment, the external teeth of the output-side rotation transmitting member 532) to accordingly rotate the output-side rotation transmitting member 532. However, since the output-side teeth part 5321a formed on the inner peripheral surface of the output-side rotation transmitting member 532 is out of mesh with the input-side teeth parts 5312a, 5312a of the plates 5312, 5312 as illustrated in FIG. 21(a), the output-side rotation transmitting member 532 rotates idly, so that the input counter torque is not transmitted to the drive shaft 51a of the motor 51 coupled via the input-side rotation transmitting member 531 but is cut off. Therefore, during the non-energization period, it is possible to move the upper rails 12 forward and rearward relatively to the lower rails 11 by the manual operation without giving a load to the motor 51.

The clutch 530 of this embodiment thus transmits the torque from the input side, but cuts off the input counter torque from the output side without transmitting it. Such a clutch which cuts off the input counter torque is generally structured to have a roller disposed between an input outer ring and an output inner ring, a retainer retaining this roller, a centering spring for positioning the retainer, and so on as disclosed in, for example, Japanese Unexamined Patent Application Publication No. 2003-120715. Specifically, the input outer ring has, on its inner peripheral surface, a cam surface which forms a wedge clearance becoming narrower from a center position in a movable range of the roller symmetrically both in forward and reverse rotation directions, and when the roller is located at the center of the wedge clearance, there is a clearance between the roller and the output inner ring, so that the output inner ring is freely rotatable, so that a mode in which the input counter torque from the output side is not transmitted to the input outer ring is entered. On the other hand, when the input outer ring is rotated, the retainer rotates to press and shrink the centering spring, and the roller moves in a direction in which the wedge clearance becomes narrow, to penetrate in the wedge clearance against the elastic force of the centering spring, so that a mode in which the rotational torque input to the input outer ring is transmitted to the output inner ring via the roller is entered. Then, when the rotation operation of the input outer ring stops, the roller returns to the center position of the wedge clearance due to a restoring force of the centering spring.

However, in the case of the structure utilizing frictional resistance caused by the circumferential-direction penetration of the roller as disclosed in Japanese Unexamined Patent Application Publication No. 2003-120715, a change of a penetration amount of the roller into the wedge clearance results in a change of the frictional resistance. Since the penetration amount of the roller depends on the shaft rotation speed on the input side, the penetration amount becomes larger when the shaft rotation speed on the input side is high than when it is low. As described above, since the roller moves in and penetrates into the wedge clearance against the elastic force of the centering spring, the centering spring which is designed according to the high shaft rotation speed of the input side is generally used for the positioning, but if the shaft rotation speed on the input side is low in such a positioning state, a spring force of the centering spring is strong to reduce the penetration amount of the roller, which sometimes causes a case where the torque on the input side is not smoothly transmitted to the output side. As a result, the movement is not sometimes stable at the time of the change between the mode in which the rotational torque on the input side is transmitted and the mode in which the rotational torque on the output side is cut off.

On the other hand, the clutch 530 of this embodiment does not utilize the penetration of the roller in the rotation direction, but controls the meshed state and the non-meshed state between the input-side teeth parts 5312a, 5312a and the output-side teeth part 5321a, depending on the radial-direction movement of the plates 5312, 5312. Therefore, without relying on the shaft rotation speed on the input side, a speedily responsive and stable operation is enabled at the time of the change between the mode in which the rotational torque of the input side is transmitted and the mode in which the input counter torque from the output side is cut off.

In this embodiment, the clutch 530 is applied to the power seat slide device 1, but is applicable to various structures capable of transmitting a rotational torque from an input side and requiring the cutting off of an input counter torque from an output side. For example, if it is applied to the electrically assisted cart disclosed in the aforesaid Japanese Unexamined Patent Application Publication No. 2003-120715, it is operated at the time of the front-rear movement by the driving of the motor which is the input side, and when the motor stops, the torque from the output side is not transmitted to the motor, so that the cart can be manually moved.

Further, this embodiment is structured such that the input-side teeth parts 5312a, 5312a are formed on the outer peripheral surfaces of the plates 5312, 5312, the output-side teeth part 5321a is formed on the inner peripheral surface of the output-side rotation transmitting member 532, and the both are brought into mesh with each other by the plates 5312, 5312 being slid in the radially spreading direction, but depending on the shape or the structure of the input-side rotation transmitting member 531 and the output-side rotation transmitting member 532, adoptable is a structure in which, for example, when the plates 5312, 5312 are slid in the opposite direction (radially approaching direction), the input-side teeth parts and the output-side teeth part come into mesh with each other, and when they are slid in the radially spreading direction, they become out of mesh with each other.

Figure 22:
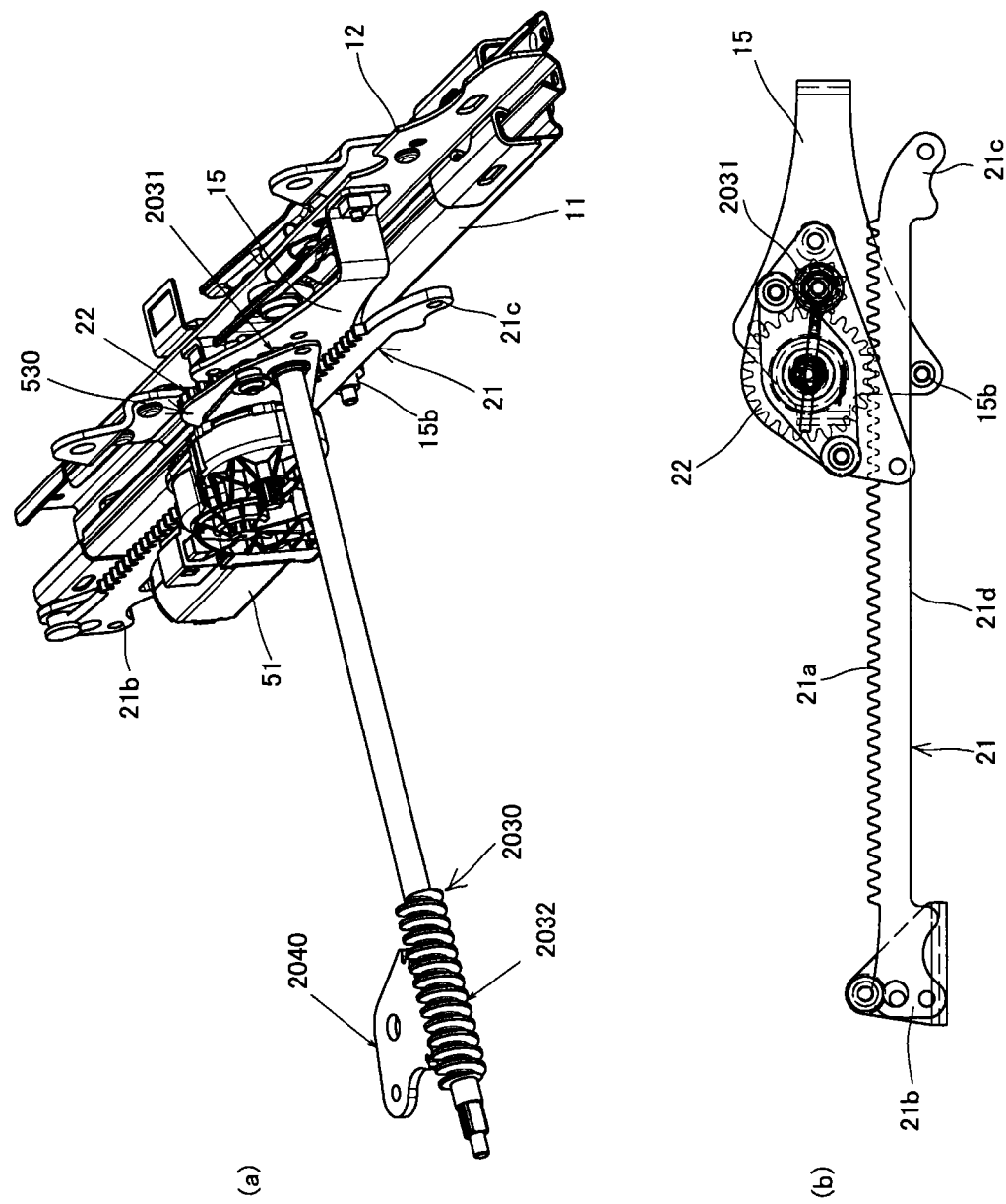
FIGS. 22(a) and (b) illustrate an essential part of a structural example in which a lifter interlocking mechanism is provided in a slide control mechanism of the fourth embodiment, FIG. 22(a) being a perspective view and FIG. 22 (b) being a side view.

FIG. 22 illustrates a structure example where a lifter interlocking mechanism similar to those of the above-described embodiments is disposed in the slide control mechanism of the fourth embodiment. Specifically, it is a structure in which a spur gear 2031 meshed with the pinion 22 and a worm 2032 which rotates in accordance with the rotation of the spur gear 2031 are disposed as the up-down movement relay gear 2030, and a worm wheel meshed with the worm 2031 is disposed as the lift gear 2040. A link mechanism which moves the cushion frame up and down is coupled to the lift gear 2040 formed of the worm wheel, as in the above-described embodiment. Therefore, when the pinion 22 rotates at the time of the front-rear slide adjustment, its torque rotates the lift gear 2040 via the up-down movement relay gear 2030, so that the cushion frame moves up or down in conjunction with the front-rear slide adjustment, as in the above-described embodiments.

Figure 21:
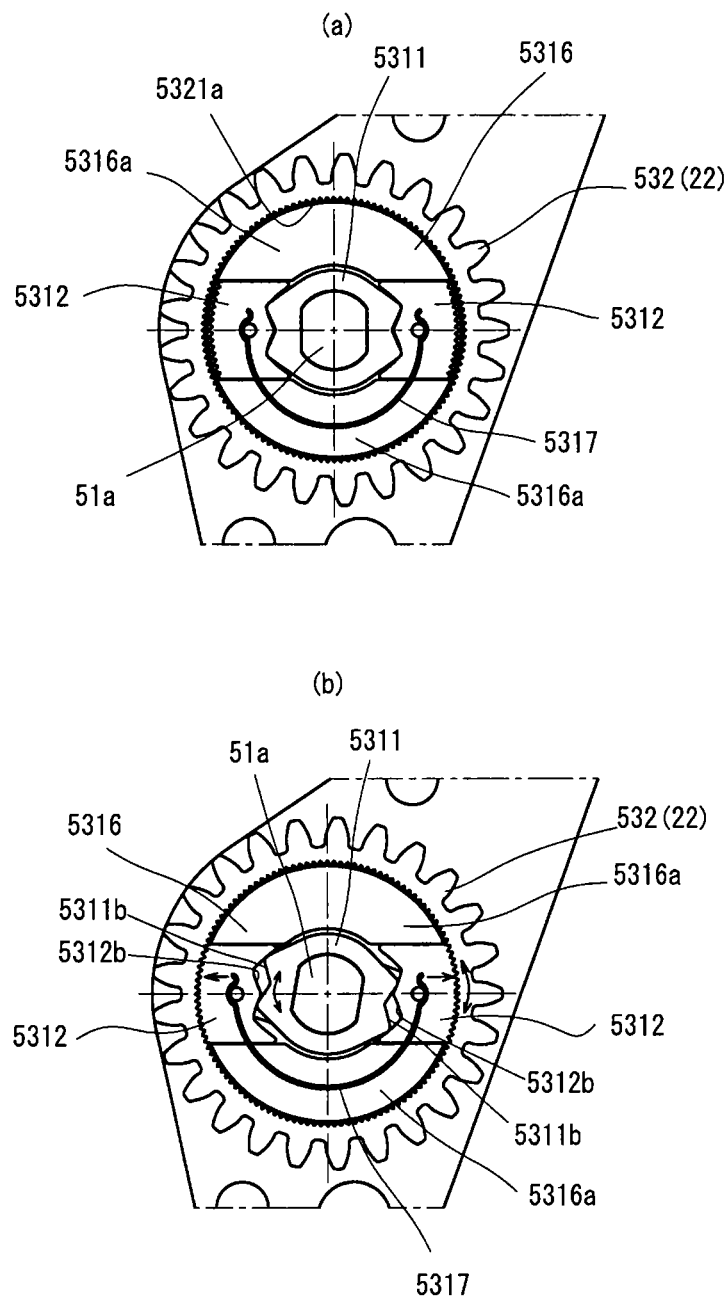
FIGS. 21(a) and (b) are explanatory views of the operation of the clutch according to the fourth embodiment, FIG. 21(a) illustrating a view of a non-meshed state between input-side teeth parts and an output-side teeth part, and FIG. 21(b) illustrating a view of a meshed state between the input-side teeth parts and the output-side teeth part.

In the example illustrated in FIG. 17 and FIG. 21, the annular part 5321 (refer to FIG. 18) of the output-side rotation transmitting member 532 included in the clutch 530 has the external teeth on its outer peripheral surface, and the external teeth themselves are used as the pinion 22 meshed with the rack 21. That is, this is a structure in which the torque of the output-side rotation transmitting member 532 is directly transmitted to the pinion 22. When the rotation of the motor 51 is slow, such a structure may be adopted, but in a case where a motor that rotates at a predetermined high rotation speed or more is used as the motor 51, the motor is preferably coupled to the pinion 22 via a speed reducing mechanism. For example, a structure illustrated in FIG. 23 is adoptable in which, when it is coupled to the upper rail attachment bracket 15, a power gear 5325 fixed to the internal gear forming the output-side rotation transmitting member 532 is interposed, an idle gear 5326 formed of a large-diameter spur gear meshed with this power gear 5325 is disposed, and the pinion 22 is brought into mesh with the idle gear 5326, so that the torque of the motor 51 is reduced in speed to be transmitted.

Figure 23:
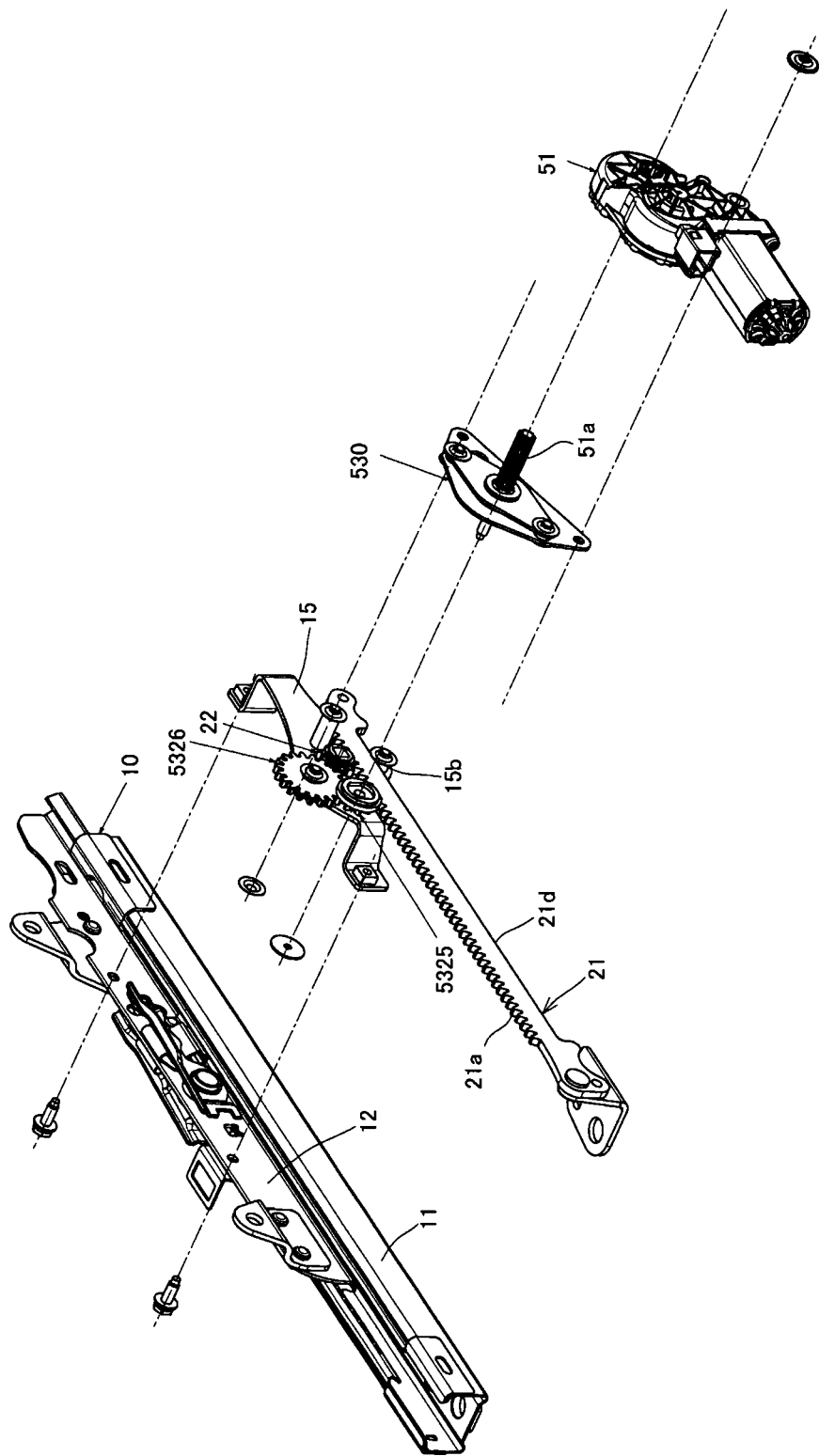
FIG. 23 is an exploded perspective view illustrating an example in which the clutch according to the fourth embodiment is coupled to an upper rail via a speed reducing mechanism.

In the example in FIG. 23, the pinion 22 is in mesh both with the idle gear 5326 and the rack 21. Therefore, the pinion 22 is given a force in a direction in which it is pressed to the teeth 21a of the rack 21 by the idle gear 5326. In addition, the guide member 15b abuts on the lower surface 21d of the rack 21. Therefore, backlash between the pinion 22 and the rack 21 is more suppressed than in the example illustrated in FIG. 7 and FIG. 21, so that the rotation operation of the pinion 22 becomes smoother, which can contribute to further reduction of noise.

EXPERIMENTAL EXAMPLE

A noise experiment during running was conducted on the power seat slide device 1 in the example illustrated in FIG. 23 in the fourth embodiment. In this experiment, which was conducted by the examination method proposed by the applicant of the present applicant as Japanese Patent Application No. 2012-274105, a vibration sensor is attached to the power seat slide device 1 and by analyzing a detection signal of the vibration sensor, it is determined whether or not noise is present. As a result of studies of Japanese Patent Application No. 2012-274105 and following studies, it has been found out by frequency analysis of the detection signal of the vibration sensor that, in power seat slide devices determined as "having noise" in sensory evaluation, an especially high vibrational spectrum appears in a predetermined frequency band of around 200 to 500 Hz, as compared with those determined as "not having noise" by the sensory evaluation.

Then, the vibration sensor was attached to the upper rail attachment bracket 15 (refer to FIG. 17) to which the clutch 530 is attached, and the upper rails 12 were driven forward and rearward relatively to the lower rails 11 in the electric mode, and the presence/absence of noise was determined. The results are presented in FIG. 24 and FIG. 25.

Figure 24:
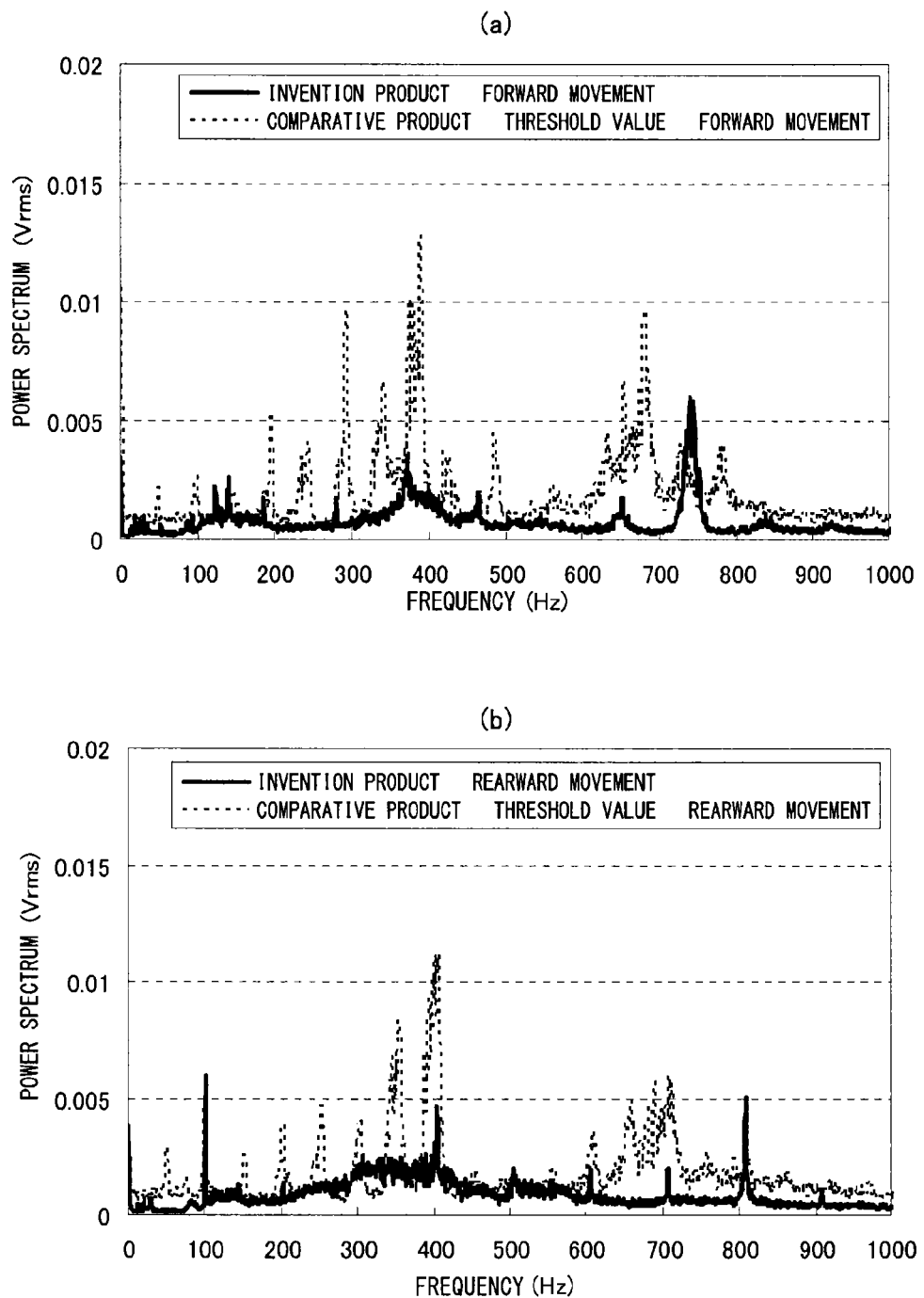
FIGS. 24(a) and (b) are charts illustrating measurement results of vibration level by a vibration sensor which results are used for noise evaluation when the power seat slide device in the example illustrated in FIG. 23 in the fourth embodiment is driven, FIG. 24(a) being a chart illustrating the result at the time of forward movement and FIG. 22(b) being a chart illustrating the result at the time of rearward movement.
Figure 25:
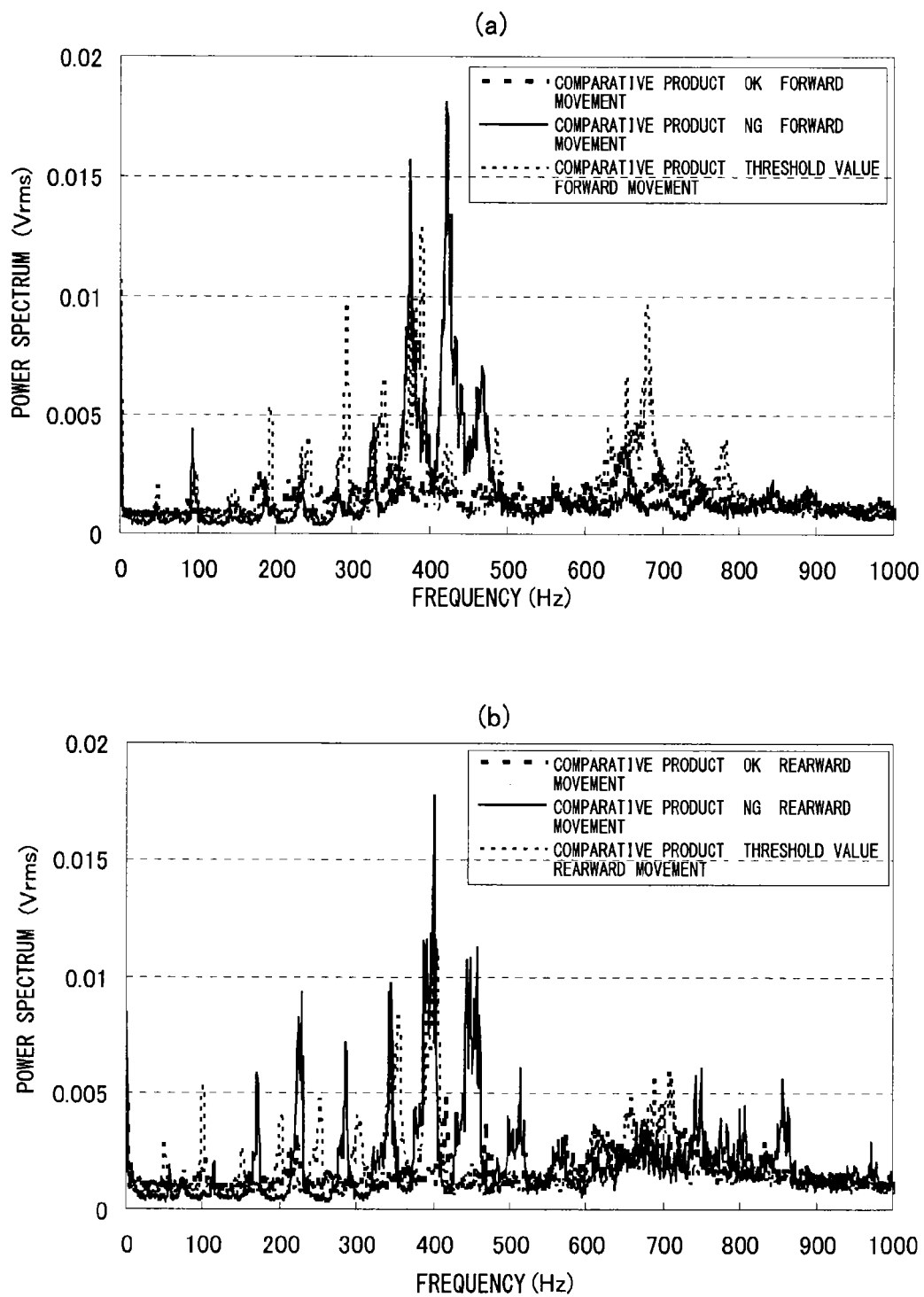
FIGS. 25(a) and (b) are charts illustrating measurement results when a threshold value of the vibration level serving as a basis of the noise evaluation which is used in the evaluation in FIGS. 24(a) and (b) is decided, FIG. 25(a) being a chart illustrating the result at the time of the forward movement and FIG. 25(b) being a chart illustrating the result at the time of the rearward movement.

In FIG. 24 and FIG. 25, "invention product" represents data measured when a 784 N weight was placed on the cushion frame supported on the upper rails 12 in the example illustrated in FIG. 23, and "comparative product" represents data measured when the same weight was placed on a conventional power seat slide device. The cushion frame in the example illustrated in FIG. 23 ("invention product") is structured such that the rack 21 and the pinion 22 are adopted without using a slide screw, the rack 21 is sandwiched by the pinion 22 and the guide member 15*b*, the pinion 22 is disposed in mesh with both the idle gear 5326 and the rack 21, and in addition, the pinion 22 is connected to the drive shaft 51*b* of the motor 51 via the clutch 530 to be rotated. On the other hand, the "comparative product" is structured such that a slide screw is used, a reduction gear is meshed with a pinion, and a torque of a motor is transmitted to the reduction gear via a cable.

Here, data of "comparative product threshold value" is a threshold value set between data on a power slide device determined as "not having noise" in the sensory evaluation ("comparative product OK") and data on a power seat slide device determined as "having noise" ("comparative product NG"), among the "comparative products", as illustrated in FIG. 25, and if a comparative product has a lower value than the "comparative product threshold value" as a whole in the vibrational spectrum of around 200 to 500 Hz, this product can be determined as a good product "not having noise".

Here, when the cushion frame in the example illustrated in FIG. 23 ("invention product") is compared with the "comparative product threshold value", its data both for the forward movement and the rearward movement are apparently lower than the "comparative product threshold value" especially in the frequency band of 200 to 500 Hz as illustrated in FIG. 24. From this, it is understood that, according to the example illustrated in FIG. 23, the pinion 22 rarely makes the irregular up-down movement relatively to the rack 21, and as a result, what is called rattle noise or the like generated by the irregular up-down movement is suppressed, and the above-described structure is effective as a noise countermeasure. Incidentally, in the data of the "invention product" in FIG. 24, high peak vibrational spectrums appear near 750 Hz at the time of the forward movement and near 800 Hz at the time of the rearward movement, but they are ascribable to the rotation of a shaft in the motor (one used in this experiment has 93.26 rotation/second), and since the rotor has eight grooves, about 746 Hz vibration (at the time of the rearward movement, this becomes high since the movement speed becomes high) which is about eight times the above is detected. That is, they are not sensed as sound or the like generated due to a gap between the rack 21 and the pinion 22 at the time of the forward and rearward movements, but are vibration components which are not targets of the noise evaluation.

Incidentally, as a lifter, one adopting a lock mechanism of what is called a brake drum type has conventionally been known. This expands/contracts a coil spring on a drum and utilizes friction therebetween. Therefore, this has a problem that, when a load enters from a cushion frame side due to the vibration or the like during running, the drum rotates in a lock release direction to gradually lower the position of the cushion frame. However, as described above, the clutch 530 according to the fourth embodiment controls the meshed state or the non-meshed state between the input-side teeth parts 5312*a*, 5312*a* formed on the outer peripheral surfaces of the plates 5312, 5312 and the output-side teeth part 5321*a* formed on the inner peripheral surface of the output-side rotation transmitting member 532, depending on the radial-direction movement of the plates 5312, 5312. Therefore, when the aforesaid clutch 530 is incorporated in the lifter to be applied as a lock mechanism, a drive part of the lifter does not rotate in the lock release direction due to the vibration or the like during running, which can solve the problem that the position of the cushion frame gradually lowers.

INDUSTRIAL AVAILABILITY

It is preferable to use the power seat slide device 1 described above typically for seats for automobiles, especially for driver seats, but it is applicable also to seats for vehicles such as airplanes, not limited to automobiles.

EXPLANATION OF REFERENCE SIGNS

1 power seat slide device
10 slider
11 lower rail
12 upper rail
13 lock mechanism
20, 200, 2000 slide control mechanism
21, 201, 2100 rack
22, 202, 2200 pinion
23, 203 up-down movement relay gear
24, 204 lift gear
24*c*, 204*c* power transmission shaft
25, 205 link mechanism
251, 2051 front link
252, 2051 rear link
26, 206 elastic member
50 electric mechanism
51 motor
51*a* drive shaft
51*b* gearbox
53, 530 clutch
531 input-side rotation transmitting member
5311 cam
5312 plate
5312*a* input-side teeth part
532 output-side rotation transmitting member
5321*a* output-side teeth part
100 cushion frame
110 side frame

The invention claimed is:

1. A power seat slide device which adjusts a pair of sliders arranged at a predetermined interval by a driving force of a motor to adjust a position of a seat cushion in a front-rear direction in a vehicle seat,
the pair of sliders each comprising:
a lower rail fixed to a floor of the vehicle seat, with a longitudinal direction of the lower rail being along the front-rear direction of the seat cushion;
an upper rail disposed to be movable along the longitudinal direction of the lower rail and supporting a cushion frame of the seat cushion; and
a lock mechanism which locks the upper rail to the lower rail at an appropriate slide position, the device further comprising:
a rack disposed along the longitudinal direction of the lower rail; and
a pinion which is supported on the upper rail or the cushion frame, is meshed with the rack, and rotates by the driving force of the motor being transmitted thereto, wherein, while the motor is energized, the motor is actuated in conjunction with a release operation of the lock mechanisms to rotate the pinion to cause front-rear movement of the upper rails along the lower rails, wherein, while the motor is not energized, the front-rear movement of the upper rails along the lower rails is enabled by manual adjustment, and wherein the lock mechanisms are disposed on both sides of each of the upper rails, and the lock mechanisms perform the locking by engaging with the lower rails, and the motor is actuated in conjunction with the release operation of the lock mechanisms to rotate the pinion to cause the front-rear movement of the upper rails along the lower rails.

2. The power seat slide device according to claim 1, wherein the motor includes a gearbox interposed between the motor and the pinion and a rotation speed of the pinion is adjustable by the motor.

3. The power seat slide device according to claim 1, wherein a control circuit formed of a parallel circuit of a rectifying element and a resistor is interposed between the motor and a power source which supplies a current to the motor, and wherein setting is made so that switching to rotate the motor in one direction causes the current to flow from the power source to the motor and the rectifying element of the parallel circuit in the order mentioned, and switching to rotate the motor in the other direction causes the current to flow from the power source to the resistor of the parallel circuit and the motor in the order mentioned.

4. The power seat slide device according to claim 1, wherein each of the lock mechanisms includes an elastic lock member supported on the upper rail and formed of an elastic member including a lock claw engaged with an engaged part formed in the lower rail, and elasticity of the elastic lock members acts on the lower rails and the upper rails, with the elastic lock members serving as elastic fulcrums.

5. The power seat slide device according to claim 1, comprising a guide member which is supported on the upper rail or the cushion frame so as to be abuttable on a surface, of the rack, where teeth are not formed, and which moves forward and rearward along the rack in accordance with the rotation of the pinion while being in a positional relation in which the guide member and the pinion in mesh with the teeth of the rack sandwich the rack, and suppresses backlash between the pinion and the rack.

6. The power seat slide device according to claim 1, wherein the rack is attached, with one end being a fixed end fixed to the lower rail and with the other end being a free end which is not fixed.

7. The power seat slide device according to claim 1, wherein the rack is disposed along a side surface of the lower rail of one of the pair of sliders, with the teeth of the rack located at a lower height than an upper surface of the lower rail.

8. The power seat slide device according to claim 1, wherein, in accordance with the front-rear movement of the upper rails along the lower rails while the motor is not energized, an electromagnetic force is generated in the motor due to rotation of a drive shaft of the motor, and the motor functions as a damper which makes the moving operation of the upper rails in the front-rear direction slow.

9. The power seat slide device according to claim 1, wherein a clutch is interposed between the motor and the pinion, and while the motor is energized, the clutch transmits a torque of the motor to the pinion to enable the electric adjustment, and while the motor is not energized, the clutch does not transmit a torque of the pinion to the motor, and the manual adjustment of the movement of the upper rails in the front-rear direction is enabled.

10. The power seat slide device according to claim 9, wherein the clutch includes:

an input-side torque transmitting member including an input-side teeth part on a peripheral surface and provided so as to be displaceable in a radial direction by the torque of the motor;

an output-side torque transmitting member which includes an output-side teeth part meshable with the input-side teeth part in accordance with the displacement of the input-side teeth part in the radial direction, and which rotates the pinion; and a biasing member which biases the input-side teeth part in the radial direction being a direction in which the input-side teeth part separates from the output-side teeth part, wherein torques both in forward and reverse directions from the motor side while the motor is energized displace the input-side torque transmitting member in the radial direction against an elastic force of the biasing member to bring the input-side teeth part into mesh with the output-side teeth part, and rotate the output-side torque transmitting member to be transmitted to the pinion, and wherein, while the motor is not energized, the elastic force of the biasing member separates the input-side teeth part from the output-side teeth part, and a counter input torque from the pinion side is cut off without being transmitted from the output-side torque transmitting member to the input-side torque transmitting member.

11. The power seat slide device according to claim 10, wherein the input-side torque transmitting member includes a plurality of plates, the input-side teeth part being formed on a peripheral surface of each of the plates, and includes a cam which is coupled to the drive shaft of the motor and which displaces the plates in the radial direction when rotating together with the drive shaft, to bring the input-side teeth parts into mesh with the output-side teeth part.

12. The power seat slide device according to 11, wherein the cam has cam-side tapered surfaces on a peripheral surface, and the plates have plate-side tapered surfaces facing the cam-side tapered surfaces; and wherein either the cam-side tapered surfaces or the plate-side tapered surfaces are formed in a mountain shape and the others are formed in a valley shape, and in a positional relation in which apex portions and bottom portions face each other, the input-side teeth parts are at a non-meshed position where the input-side teeth parts are apart from the output-side teeth part, and when the apex portions and the bottom portions are separated from facing positions along the cam-side tapered surfaces or the plate-side tapered surfaces by the rotation of the drive shaft, the input-side teeth parts and the output-side teeth part are at a meshed position.

13. The power seat slide device according to claim 12, wherein the biasing member is a member which is coupled to the plates of the input-side torque transmitting member and which biases the plates in the radial direction so that the apex portions or the bottom portions of the plate-side tapered surfaces are at positions facing the bottom portions or the apex portions of the cam-side tapered surfaces.

14. The power seat slide device according to claim 12,
wherein the cam-side tapered surfaces are formed on an outer peripheral surface of the cam,
wherein, in each of the plates, the plate-side tapered surface is formed on an inner peripheral surface, and the input-side teeth part is formed on an outer peripheral surface, and
wherein the output-side torque transmitting member is formed of an internal gear including, on an inner peripheral surface, the output-side teeth part which comes into mesh with the input-side teeth parts.

15. The power seat slide device according to claim 1, further comprising:
an up-down movement relay gear which transmits the torque of the pinion;
a lift gear which is meshed with the up-down movement relay gear to displace in an up-down direction; and
a link mechanism including a plurality of links which pivot when the lift gear displaces in the up-down direction and any of which is coupled to the side frame,
wherein, when the seat cushion moves forward by the operation of the sliders, the seat cushion moves up in conjunction with the sliders, and when the seat cushion moves rearward by the operation of the sliders, the seat cushion moves down in conjunction with the sliders.

16. The power seat slide device according to claim 15,
wherein the up-down movement relay gear is formed of a worm disposed along a direction substantially perpendicular to the longitudinal direction of the slider,
wherein the lift gear is formed of a worm wheel meshed with the worm, and
wherein the power seat slide device has a self-lock function of hindering transmission of a force from the seat cushion to the sliders.

17. The power seat slide device according to claim 15, wherein the up-down movement relay gear is formed of a gear disposed coaxially with the pinion and smaller in diameter than the pinion.

18. The power seat slide device according to claim 15,
wherein the plural links included in the link mechanism include front links and rear links which are disposed apart from each other in the front-rear direction of the upper rails and the side frames, the front links and the rear links including upper portions pivotally supported on the upper rails of the pair of sliders and including lower portions pivotally supported on the left and right side frames of the seat cushion, and the side frames are supported by the upper rails in a suspended manner, and
wherein a displacement amount between a lower limit position and an upper limit position of the front links accompanied by the front-rear movement of the seat cushion is smaller than a displacement amount between a lower limit position and an upper limit position of the rear links, whereby a seating surface angle when the seat cushion is at a front end and an upper limit becomes smaller than a seating surface angle when the seat cushion is at a rear end and a lower limit.

19. A vehicle seat which includes a seat cushion and a seat back, the vehicle seat comprising
the power seat slide device according to claim 1.

20. A power seat slide device which adjusts a pair of sliders arranged at a predetermined interval by a driving force of a motor to adjust a position of a seat cushion in a front-rear direction in a vehicle seat,
the pair of sliders each comprising:
a lower rail fixed to a floor of the vehicle seat, with a longitudinal direction of the lower rail being along the front-rear direction of the seat cushion;
an upper rail disposed to be movable along the longitudinal direction of the lower rail and supporting a cushion frame of the seat cushion; and
a lock mechanism which locks the upper rail to the lower rail at an appropriate slide position, the device further comprising:
a rack disposed along the longitudinal direction of the lower rail; and
a pinion which is supported on the upper rail or the cushion frame, is meshed with the rack, and rotates by the driving force of the motor being transmitted thereto,
wherein, while the motor is energized, the motor is actuated in conjunction with a release operation of the lock mechanisms to rotate the pinion to cause front-rear movement of the upper rails along the lower rails, and
wherein, while the motor is not energized, the front-rear movement of the upper rails along the lower rails is enabled by manual adjustment.

* * * * *